United States Patent
Krzyzanowski et al.

(10) Patent No.: US 10,432,756 B2
(45) Date of Patent: Oct. 1, 2019

(54) LEGACY DEVICE BRIDGE FOR RESIDENTIAL OR NON-RESIDENTIAL NETWORKS

(71) Applicant: Microsoft Technology Licensing, LLC, Redmond, WA (US)

(72) Inventors: Paul Krzyzanowski, Flemington, NJ (US); Wayzen Lin, Wellesley, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/434,996

(22) Filed: Feb. 16, 2017

(65) Prior Publication Data

US 2017/0163773 A1 Jun. 8, 2017

Related U.S. Application Data

(63) Continuation of application No. 14/319,240, filed on Jun. 30, 2014, now Pat. No. 9,578,140, which is a
(Continued)

(51) Int. Cl.
*H04L 29/06* (2006.01)
*H04L 12/28* (2006.01)
(Continued)

(52) U.S. Cl.
CPC .............. *H04L 69/08* (2013.01); *G08C 17/02* (2013.01); *G08C 19/16* (2013.01); *H04L 12/282* (2013.01);
(Continued)

(58) Field of Classification Search
CPC ..... H04L 69/08; H04L 69/16; H04L 12/2836; H04L 29/06; H04L 12/2814; H04L 12/282; G08C 17/02; G08C 19/16
See application file for complete search history.

(56) References Cited

U.S. PATENT DOCUMENTS 5,414,426 A 5/1995 O'Donnell et al.
5,519,878 A 5/1996 Dolin, Jr.
(Continued)

FOREIGN PATENT DOCUMENTS

CN 1288540 A 3/2001
EP 813138 A1 12/1997
(Continued)

OTHER PUBLICATIONS

"Office Action Issued in European Patent Application No. 03796775.9", dated Apr. 13, 2017, 4 Pages.
(Continued)

*Primary Examiner* — Walli Z Butt
(74) *Attorney, Agent, or Firm* — Fiala & Weaver P.L.L.C.

(57) ABSTRACT

A legacy device bridge for use in a network, such as a wired or wireless residential network, is provided. The legacy device bridge performs protocol conversion to enable a network-attached entity that uses a packet-based communication protocol to communicate with and control legacy devices, such as consumer electronics, that rely exclusively on infrared (IR) or serial communication protocols. The legacy device bridge also performs a virtualization function that allows legacy devices to be advertised to the network as devices that comply with a packet-based discovery and control protocol, and to be controlled as such. The legacy device bridge is also adapted to probe, deduce and publish information relating to the state of a legacy device to other entities on the network.

20 Claims, 13 Drawing Sheets

Related U.S. Application Data continuation of application No. 13/178,707, filed on Jul. 8, 2011, now Pat. No. 8,793,746, which is a continuation of application No. 10/387,590, filed on Mar. 14, 2003, now Pat. No. 7,987,489.

(60) Provisional application No. 60/438,296, filed on Jan. 7, 2003.

(51) Int. Cl.
*G08C 17/02* (2006.01)
*G08C 19/16* (2006.01)

(52) U.S. Cl.
CPC ...... *H04L 12/2814* (2013.01); *H04L 12/2836* (2013.01); *H04L 29/06* (2013.01); *H04L 69/16* (2013.01)

(56) References Cited

U.S. PATENT DOCUMENTS

| | | |
|---|---|---|
| 5,537,463 A | 7/1996 | Escobosa et al. |
| 5,544,321 A | 8/1996 | Theimer et al. |
| 5,552,917 A | 9/1996 | Darbee et al. |
| 5,570,085 A | 10/1996 | Bertsch |
| 5,689,353 A | 11/1997 | Darbee et al. |
| 5,721,583 A | 2/1998 | Harada et al. |
| 5,771,388 A | 6/1998 | Mondrik et al. |
| 5,802,467 A | 9/1998 | Salazar et al. |
| 5,805,812 A | 9/1998 | Fish et al. |
| 5,875,108 A | 2/1999 | Hoffberg et al. |
| 5,898,386 A | 4/1999 | Kaihatsu |
| 5,926,108 A | 7/1999 | Wicks et al. |
| 5,930,699 A | 7/1999 | Bhatia |
| 5,953,144 A | 9/1999 | Darbee et al. |
| 5,956,025 A | 9/1999 | Goulden et al. |
| 5,956,487 A | 9/1999 | Venkatraman et al. |
| 5,959,751 A | 9/1999 | Darbee et al. |
| 5,963,624 A | 10/1999 | Pope |
| 5,995,744 A | 11/1999 | Guccione |
| 5,996,001 A | 11/1999 | Quarles et al. |
| 6,005,861 A | 12/1999 | Humpleman |
| 6,026,150 A | 2/2000 | Frank et al. |
| 6,032,202 A | 2/2000 | Lea et al. |
| 6,049,711 A | 4/2000 | Ben-Yehezkel et al. |
| 6,052,750 A | 4/2000 | Lea |
| 6,085,236 A | 7/2000 | Lea |
| 6,111,569 A | 8/2000 | Brusky et al. |
| 6,131,028 A | 10/2000 | Whitington |
| 6,148,205 A | 11/2000 | Cotton |
| 6,154,745 A | 11/2000 | Kari et al. |
| 6,167,046 A | 12/2000 | Terada et al. |
| 6,170,007 B1 | 1/2001 | Venkatraman et al. |
| 6,198,479 B1 | 3/2001 | Humpleman et al. |
| 6,199,066 B1 | 3/2001 | Glitho et al. |
| 6,199,136 B1 | 3/2001 | Shteyn |
| 6,208,341 B1 | 3/2001 | Van Ee et al. |
| 6,208,855 B1 | 3/2001 | Tanaka |
| 6,208,866 B1 | 3/2001 | Rouhollahzadeh et al. |
| 6,218,931 B1 | 4/2001 | Asghar et al. |
| 6,222,530 B1 | 4/2001 | Sequeira |
| 6,223,348 B1 | 4/2001 | Hayes et al. |
| 6,236,335 B1 | 5/2001 | Goodwin, III |
| 6,243,707 B1 | 6/2001 | Humpleman et al. |
| 6,243,772 B1 | 6/2001 | Ghori et al. |
| 6,259,707 B1 | 7/2001 | Dara-Abrams et al. |
| 6,266,612 B1 | 7/2001 | Dussell et al. |
| 6,275,865 B1 | 8/2001 | Zou |
| 6,282,714 B1 | 8/2001 | Ghori et al. |
| 6,288,716 B1 | 9/2001 | Humpleman et al. |
| 6,292,554 B1 | 9/2001 | Oden et al. |
| 6,317,028 B1 | 11/2001 | Valiulis |
| 6,317,718 B1 | 11/2001 | Fano |
| 6,321,092 B1 | 11/2001 | Fitch et al. |
| 6,349,352 B1 | 2/2002 | Lea |
| 6,359,270 B1 | 3/2002 | Bridson |
| 6,359,636 B1 | 3/2002 | Schindler et al. |
| 6,363,434 B1 | 3/2002 | Eytchison |
| 6,388,399 B1 | 5/2002 | Eckel et al. |
| 6,405,261 B1 | 6/2002 | Gaucher |
| 6,434,644 B1 | 8/2002 | Young et al. |
| 6,446,113 B1 | 9/2002 | Ozzie et al. |
| 6,459,217 B1 | 10/2002 | Belliveau |
| 6,463,343 B1 | 10/2002 | Emens et al. |
| 6,496,135 B1 | 12/2002 | Darbee |
| 6,505,121 B1 | 1/2003 | Russell |
| 6,512,754 B2 | 1/2003 | Feder et al. |
| 6,563,430 B1 | 5/2003 | Kemink et al. |
| 6,587,067 B2 | 7/2003 | Darbee et al. |
| 6,597,374 B1 | 7/2003 | Baker et al. |
| 6,600,421 B2 | 7/2003 | Freeman |
| 6,618,764 B1 | 9/2003 | Shteyn |
| 6,642,852 B2 | 11/2003 | Dresti et al. |
| 6,647,426 B2 | 11/2003 | Mohammed |
| 6,728,784 B1 | 4/2004 | Mattaway |
| 6,741,853 B1 | 5/2004 | Jiang et al. |
| 6,744,869 B2 | 6/2004 | Brockenbrough et al. |
| 6,748,343 B2 | 6/2004 | Alexander et al. |
| 6,792,323 B2 | 9/2004 | Krzyzanowski et al. |
| 6,792,469 B1 | 9/2004 | Callahan et al. |
| 6,870,463 B2 | 3/2005 | Dresti et al. |
| 6,882,229 B1 | 4/2005 | Ho et al. |
| 6,882,299 B1 | 4/2005 | Allport |
| 6,901,347 B1 | 5/2005 | Murray et al. |
| 6,912,429 B1 | 6/2005 | Bilger |
| 6,914,551 B2 | 7/2005 | Vidal |
| 6,937,140 B1 | 8/2005 | Outslay et al. |
| 6,943,778 B1 | 9/2005 | Astala et al. |
| 6,956,833 B1 | 10/2005 | Yukie et al. |
| 6,959,172 B2 | 10/2005 | Becker et al. |
| 6,970,127 B2 | 11/2005 | Rakib |
| 7,024,256 B2 | 4/2006 | Krzyzanowski et al. |
| 7,062,221 B1 | 6/2006 | Christensen |
| 7,080,141 B1 | 7/2006 | Baekelmancs et al. |
| 7,088,952 B1 | 8/2006 | Saito et al. |
| 7,111,320 B1 | 9/2006 | Novak |
| 7,162,228 B2 | 1/2007 | Bleile et al. |
| 7,194,755 B1 | 3/2007 | Nakata et al. |
| 7,230,563 B2 | 6/2007 | Vidal |
| 7,315,886 B1 | 1/2008 | Meenan et al. |
| 7,526,953 B2 | 5/2009 | Goodwin et al. |
| 7,676,824 B2 | 3/2010 | Accarie et al. |
| 7,933,945 B2 | 4/2011 | Krzyzanowski et al. |
| 7,987,489 B2 | 7/2011 | Krzyzanowski et al. |
| 8,793,746 B2 | 7/2014 | Krzyzanowski et al. |
| 2001/0000194 A1 | 4/2001 | Sequeira |
| 2001/0018663 A1 | 8/2001 | Dussell et al. |
| 2001/0030597 A1* | 10/2001 | Inoue ............... G05B 15/02 340/3.7 |
| 2001/0036192 A1 | 11/2001 | Chiles et al. |
| 2001/0041561 A1 | 11/2001 | Ventulett et al. |
| 2001/0047431 A1 | 11/2001 | Eytchison |
| 2001/0049275 A1 | 12/2001 | Pierry et al. |
| 2001/0049846 A1 | 12/2001 | Guzzi et al. |
| 2001/0053274 A1 | 12/2001 | Roelofs et al. |
| 2001/0054060 A1 | 12/2001 | Fillebrown et al. |
| 2001/0055954 A1 | 12/2001 | Cheng |
| 2001/0055978 A1 | 12/2001 | Herrod et al. |
| 2002/0000092 A1 | 1/2002 | Sharood et al. |
| 2002/0005430 A1 | 1/2002 | Pentel |
| 2002/0006788 A1 | 1/2002 | Knutsson et al. |
| 2002/0019984 A1 | 2/2002 | Rakib |
| 2002/0022991 A1 | 2/2002 | Sharood et al. |
| 2002/0031120 A1 | 3/2002 | Rakib |
| 2002/0033760 A1* | 3/2002 | Kobayashi .......... H04L 12/2818 709/218 |
| 2002/0034292 A1 | 3/2002 | Tuoriniemi et al. |
| 2002/0035403 A1 | 3/2002 | Clark et al. |
| 2002/0035404 A1 | 3/2002 | Ficco et al. |
| 2002/0035605 A1 | 3/2002 | McDowell et al. |
| 2002/0035621 A1 | 3/2002 | Zintel et al. |
| 2002/0036795 A1 | 3/2002 | Fujitani |
| 2002/0052138 A1 | 5/2002 | Janik |
| 2002/0068984 A1 | 6/2002 | Alexander et al. |

(56) References Cited

U.S. PATENT DOCUMENTS

| | | |
|---|---|---|
| 2002/0072356 A1 | 6/2002 | Yamashita et al. |
| 2002/0078161 A1* | 6/2002 | Cheng ................ H04L 12/2803 |
| | | 709/208 |
| 2002/0087746 A1 | 7/2002 | Ludtke et al. |
| 2002/0180581 A1 | 12/2002 | Kamiwada et al. |
| 2003/0005430 A1 | 1/2003 | Kolessar |
| 2003/0014691 A1 | 1/2003 | Abdelilah et al. |
| 2003/0040813 A1 | 2/2003 | Gonzales et al. |
| 2003/0071117 A1 | 4/2003 | Meade, II |
| 2003/0073411 A1 | 4/2003 | Meade, II |
| 2003/0095791 A1 | 5/2003 | Barton et al. |
| 2003/0101294 A1 | 5/2003 | Saint-Hilaire et al. |
| 2003/0103088 A1 | 6/2003 | Dresti et al. |
| 2003/0105854 A1 | 6/2003 | Thorsteinsson et al. |
| 2003/0136827 A1 | 7/2003 | Kaneko et al. |
| 2003/0147624 A1 | 8/2003 | Trajkovic et al. |
| 2003/0163542 A1* | 8/2003 | Bulthuis ................ G08C 19/28 |
| | | 709/208 |
| 2003/0163626 A1 | 8/2003 | Chen et al. |
| 2003/0181168 A1 | 9/2003 | Herrod et al. |
| 2003/0191826 A1 | 10/2003 | Bellinger et al. |
| 2003/0204582 A1 | 10/2003 | Shimoda et al. |
| 2003/0207668 A1 | 11/2003 | McFarland et al. |
| 2003/0208595 A1 | 11/2003 | Gouge |
| 2003/0220988 A1 | 11/2003 | Hymel |
| 2003/0224735 A1 | 12/2003 | Moursund et al. |
| 2003/0224807 A1 | 12/2003 | Sinha et al. |
| 2003/0236890 A1 | 12/2003 | Hurwitz et al. |
| 2004/0003051 A1 | 1/2004 | Krzyzanowski et al. |
| 2004/0003073 A1 | 1/2004 | Krzyzanowski et al. |
| 2004/0019395 A1 | 1/2004 | Maymudes |
| 2004/0023635 A1 | 2/2004 | Impson et al. |
| 2004/0046677 A1 | 3/2004 | Dresti et al. |
| 2004/0047347 A1 | 3/2004 | Worry et al. |
| 2004/0054789 A1 | 3/2004 | Breh et al. |
| 2004/0066308 A1 | 4/2004 | Sampsell |
| 2004/0071136 A1 | 4/2004 | Laumen et al. |
| 2004/0098456 A1 | 5/2004 | Krzyzanowski et al. |
| 2004/0133704 A1 | 7/2004 | Krzyzanowski et al. |
| 2004/0163073 A1 | 8/2004 | Krzyzanowski et al. |
| 2004/0193449 A1 | 9/2004 | Wildman et al. |
| 2004/0224638 A1 | 11/2004 | Fadell et al. |
| 2004/0260407 A1 | 12/2004 | Wimsatt |
| 2004/0267382 A1 | 12/2004 | Cunningham et al. |
| 2005/0015764 A1 | 1/2005 | Gaur |
| 2005/0027888 A1 | 2/2005 | Juszkiewicz |
| 2005/0055472 A1 | 3/2005 | Krzyzanowski et al. |
| 2005/0108091 A1 | 5/2005 | Sotak et al. |
| 2005/0108369 A1 | 5/2005 | Sather et al. |
| 2005/0128048 A1 | 6/2005 | Krzyzanowski et al. |
| 2005/0143017 A1 | 6/2005 | Lopp et al. |
| 2005/0151640 A1 | 7/2005 | Hastings |
| 2005/0179531 A1 | 8/2005 | Tabe |
| 2005/0266878 A1 | 12/2005 | Lee et al. |
| 2005/0267935 A1 | 12/2005 | Gandhi et al. |
| 2006/0009208 A1 | 1/2006 | Jang et al. |
| 2006/0012488 A1 | 1/2006 | Hilbrink et al. |
| 2006/0046653 A1 | 3/2006 | Kirbas |
| 2006/0061958 A1 | 3/2006 | Solomon et al. |
| 2006/0142880 A1 | 6/2006 | Deen et al. |
| 2006/0218244 A1 | 9/2006 | Rasmussen et al. |
| 2007/0042806 A1 | 2/2007 | Stepanian |
| 2007/0123207 A1 | 5/2007 | Terlizzi |
| 2007/0171091 A1 | 7/2007 | Nisenboim et al. |
| 2008/0189742 A1 | 8/2008 | Ellis et al. |
| 2008/0221715 A1 | 9/2008 | Krzyzanowski et al. |
| 2010/0031295 A1 | 2/2010 | Krzyzanowski et al. |

FOREIGN PATENT DOCUMENTS

| | | |
|---|---|---|
| EP | 1085403 A2 | 3/2001 |
| EP | 1096453 A2 | 5/2001 |
| EP | 1263167 A1 | 12/2002 |
| EP | 1359524 A1 | 11/2003 |
| GB | 2350749 A | 12/2000 |
| JP | H01164449 A | 6/1989 |
| JP | H06225360 A | 8/1994 |
| JP | H08751 A | 1/1996 |
| JP | H0844986 A | 2/1996 |
| JP | H1139148 A | 2/1999 |
| JP | H1185651 A | 3/1999 |
| JP | 11122678 A | 4/1999 |
| JP | 2000035864 A | 2/2000 |
| JP | 2000253001 A | 9/2000 |
| JP | 2001053779 A | 2/2001 |
| JP | 2001092762 A | 4/2001 |
| JP | 2001223712 A | 8/2001 |
| JP | 2001290724 A | 10/2001 |
| JP | 2002044763 A | 2/2002 |
| JP | 2002152856 A | 5/2002 |
| JP | 2002176610 A | 6/2002 |
| JP | 2002199625 A | 7/2002 |
| JP | 2002237764 A | 8/2002 |
| JP | 2002325111 A | 11/2002 |
| JP | 2003316676 A | 11/2002 |
| JP | 2004320747 A | 11/2004 |
| JP | 2004348455 A | 12/2004 |
| WO | 1999056261 A1 | 11/1999 |
| WO | 2000017737 A1 | 3/2000 |
| WO | 2000039964 A1 | 7/2000 |
| WO | 2000056016 A1 | 9/2000 |
| WO | 2001078425 A1 | 10/2001 |
| WO | 2002001813 A2 | 1/2002 |
| WO | 2002063523 A1 | 8/2002 |
| WO | 03045015 A2 | 5/2003 |
| WO | 2005033839 A2 | 4/2005 |

OTHER PUBLICATIONS

"Office Action Issued in European Patent Application No. 03796775.9", dated Sep. 10, 2013, 4 Pages.

"EtherWind-Plus™ 802.11b OEM Module", Retrieved from <<https://web.archive.org/web/20041109092531/http://www.troygroup.com/wireless/documents/datasheets/TROY%20EtherWind%20Plus%20data%20sheet.pdf>>, Nov. 19, 2003, 2 Pages.

"EtherWind-Plus™ IEEE 802.11b OEM Connectivity Module", Retrieved from <<https://web.archive.org/web/20020927191452/http://www.troygroup.com/wireless/products/wireless/etherwindplus.asp>>, Retrieved Date: Nov. 19, 2003, 2 Pages.

"EtherWind™ 802.11b™ Wireless Print Server", Retrieved from <<http://www.troygroup.com/wireless/documents/datasheets/TROYU%20EtherWind.pdf>>, Nov. 19, 2003, 2 Pages.

"EtherWind™ IEEE 802. 11 b Wireless Print Server", Retrieved from <<https://web.archive.org/web/20020219181128/http://www.troygroup.com/wireless/products/wireless/etherwind.asp>>, Nov. 19, 2003, 3 Pages.

"GC-100 Key Features and Benefits", Retrieved from <<https://web.archive.org/web/20040423183143/http://www.globalcache.com/products/gc-features.html>>, Retrieved Date: Oct. 11, 2004, 2 Pages.

"Global Cache GC-100 Network Adapter- Control & Automate Common Devices Over a Network", In Proceedings of Product Data Sheet, Global Cache, Retrieved Date: Oct. 2004, 2 Pages.

"Global Cache GC-100 Network Adapter- Control & Automate Common Devices Over a Network", Retrieved from <<https://web.archive.org/web/20040402125742/http://www.globalcache.com/products/gc-index.html>>, Retrieved Date: Oct. 11, 2004, 2 Pages.

"IPL T SF/244, Two Serial, Four Flex 110, and Four IR Port IP Link™ Ethernet Control Interface With IR Learner", Retrieved from <<https://web.archive.org/web/20040326121817/http://www.extron.com/product/product.asp? id=ipltsfi244&version=print>>, Retrieved Date: Oct. 11, 2004, 6 Pages.

"Products: Rfx 6000, RF extender for TSU7000, TSU6000 & TSU3000: Using Pronto( Pro) NG with Radio requency", Retrieved from <<http://www.pronto.philips.com/index.cfm?id=577f>>, Retrieved Date: Jun. 21, 2004, 1 Page.

"Pronto RF Extender, RFX 6000, Pronto Accessory for Operating Devices Inside a Closed Cabinet, Closet or Even in Another Room", Retrieved from <<http://www.pronto.philips.com/index.cfm?id=577f>>, Nov. 19, 2003, 2 Pages.

(56) References Cited

OTHER PUBLICATIONS

"Pronto RF Extender, RFX 6000, RF extender for TSU6000 & TSU3000", Retrieved from <<http://www.pronto.philips.com/index.cfm?id=577>>, Retrieved Date: Nov. 19, 2003, 2 Pages.
"Serial Servers", Retrieved from <<https://web.archive.org/web/20040420045146/http://www.troygroup.com/Connectivity/products/SerialDeviceConnectivity/SerialServers.asp>>, retrieved Date: Jun. 24, 2004, 1 Page.
"Total Remote Software: Griffin Technology Downloads", Retrieved from <<https://web.archive.org/web/20040213112806/http://www.grithntechnology.com/software/software_totalremote.html>>, Retrieved Date: Feb. 23, 2004, 1 Page.
"Total Remote v2.0 user guide", Retrieved from <<https://web.archive.org/web/20040619235414/http://www.griffintechnology.com/downloads/pdf/manuals/Total_Remote_user_manual.pdf>>, Retrieved Date: Feb. 23, 2004, 29 Pages.
"TROY Serial Server", Retrieved from <<https://web.archive.org/web/20040421020913/http://www.troygroup.com/Connectivity/products/DataSheets/Troy%20Serial%20Server%20data%20sheet.pdf<<, Apr. 21, 2004, 2 Pages.
Rockleigh, N. J., "Crestron Introduces RMC2e 'Mini' Control System: Home Toys News Release", Retrieved from <<http://www.hometoys.com/releases/mar03/creston_02.htm>>, Mar. 5, 2003, 2 Pages.
"Troy Wireless Introduces EtherWindTM Plus 802.11 b Wireless OEM Board-Level Product: New Product Enables Wireless and Ethernet Connectivity on OEM Devices", In Proceedings of Business Wire, Santa Ana, Troy Group Inc., Aug. 13, 2002, 2 Pages.
"Supplementary Search Report Issued in European Patent Application No. 03762083.8", dated May 3, 2006, 3 Pages.
"EtherWind 802.11 b Print Server", Retrieved from <<https://web.archive.org/web/20040420050047/http://www.troygroup.com/Connectivity/products/wirelessLAN/Etherwind.asp>>, Retrieved Date: Jun. 21, 2004, 1 Page.
"Office Action Issued in European Patent Application No. 03796775.9", dated May 27, 2011, 4 Pages.
"EtherWind Plus", Retrieved from <<https://web.archive.org/web/20040420050855/http://www.troygroup.com/Connectivity/products/WirelessLAN/EtherwindPlus.asp>>, Retrieved Date: Jun. 21, 2004, 1 Page.
"Supplementary Partial Search Report Issued in European Patent Application No. 04716866.1", dated Jul. 25, 2007, 5 Pages.
"Supplementary Search Report Issued in European Patent Application No. 04813734.3", dated Feb. 18, 2010, 3 Pages.
"Supplementary Search Report Issued in European Patent Application No. 06815786.6", dated May 18, 2010, 11 Pages.
"Final Office Action Issued in U.S. Appl. No. 10/387,590", dated Nov. 14, 2007, 15 Pages.
"Final Office Action Issued in U.S. Appl. No. 10/387,590", dated Jan. 22, 2009, 16 Pages.
"Final Office Action Issued in U.S. Appl. No. 10/387,590", dated Jan. 22, 2007, 12 Pages.
"Non Final Office Action Issued in U.S. Appl. No. 10/387,590", dated Jul. 13, 2007, 17 Pages.
"Non Final Office Action Issued in U.S. Appl. No. 10/387,590", dated Jul. 31, 2006, 11 Pages.
"Non Final Office Action Issued in U.S. Appl. No. 10/387,590", dated Apr. 2, 2008, 16 Pages.
"Notice of Allowance Issued in U.S. Appl. No. 10/387,590", dated Oct. 4, 2010, 12 Pages.
"Notice of Allowance Issued in U.S. Appl. No. 10/387,590", dated Mar. 17, 2011, 8 Pages.
"Notice of Allowance Issued in U.S. Appl. No. 13/178,707", dated Mar. 14, 2014, 9 Pages.
"Notice of Allowance Issued in U.S. Appl. No. 13/178,707", dated Jun. 10, 2014, 2 Pages.
"Non Final Office Action Issued in U.S. Appl. No. 131178,707", dated Nov. 22, 2013, 7 Pages.
"Final Office Action Issued in U.S. Appl. No. 14/319,240", dated Jul. 19, 2016, 8 Pages.
"Non Final Office Action Issued in U.S. Appl. No. 14/319,240", dated Mar. 11, 2016, 7 Pages.
"Notice of Allowance Issued in U.S. Appl. No. 14/319,240", dated Oct. 7, 2016, 10 Pages.
"Office Action Issued in Japanese Patent Application No. 2004-517889", dated Feb. 25, 2010, 11 Pages.
"Office Action Issued in Japanese Patent Application No. 2006-508998", dated Jul. 27, 2010, 7 Pages.
"Office Action Issued in Japanese Patent Application No. 2006-508998", dated Feb. 9, 2010, 11 Pages.
Bantz, et al., "Keyboard Device for Upper and Lower Case Keying Without Shifting", In Proceedings of IBM Corporation, Technical Disclosure Bulletin, vol. 21, No. 9, Feb. 1, 1979, pp. 3845-3846.
"International Search Report and Written Opinion Issued in PCT Patent Application No. PCT/US2003/20189", dated Oct. 29, 2003, 1 Page.
"International Search Report and Written Opinion Issued in PCT Patent Application No. PCT/US2006/38044,", dated Jun. 19, 2008, 12 Pages.
"Harmony Remote—Features", https://web.archive.org/web/20040215054024/http://www.harmonyremote.com/product_features.htm, 4 Pages.
"Harmony Remote—Frequently Asked Questions", https://web.archive.org/web/20040411055205/http://www.harmonyremote.com/faq.htm, 2 Pages.
"Harmony Remote—Overview", https://web.archive.org/web/20040402101754/http://www.harmonyremote.com/product_overview.htm, 2 pages.
"Harmony Remote SST-659 User Manual", https://web.archive.org/web/20040611020334fw_/http://www.harmonyremote.com:80/Downloads/Harmony_H659_User Manual.pdf, 20 Pages.
"Harmony Remote SST-768 User Manual", http://members.harmonyremote.com/easyzapper/ProcessUserDocumentation/768/Index.asp?Language=nor, 18 Pages.
"Specifications for Harmony Remote", https://web.archive.org/web/20040215055535/http://www.harmonyremote.com:80/product_specifications.htm, 2 Pages.
"Oral Hearing issued in European Patent Application No. 05824839.4", dated May 24, 2013, 9 Pages.
"Final Office Action Issued in U.S. Appl. No. 11/042,178", dated Apr. 30, 2008, 14 Pages.
"Non Final Office Action Issued in U.S. Appl. No. 11/042,178", dated Oct. 17, 2007, 10 Pages.
"Non Final Office Action Issued in U.S. Appl. No. 11/042,178", dated Aug. 7, 2008, 12 Pages.
"First Office Action Issued in Canada Application No. 2,589,821", dated Oct. 18, 2012, 3 Pages.
"Office Action Issued in Canadaian Application No. 2,589,821", dated Sep. 12, 2013, 2 Pages.

* cited by examiner

LEGACY DEVICE BRIDGE FOR RESIDENTIAL OR NON-RESIDENTIAL NETWORKS

CROSS-REFERENCE TO RELATED APPLICATIONS

This application is a continuation of U.S. patent application Ser. No. 14/319,240, filed Jun. 30, 2014, which is a continuation of U.S. patent application Ser. No. 13/178,707, filed Jul. 8, 2011, which is a continuation of U.S. patent application Ser. No. 10/387,590, filed Mar. 14, 2003, which claims priority to U.S. Provisional Patent Application No. 60/438,296, filed Jan. 7, 2003. The entirety of each of these applications is incorporated by reference herein.

BACKGROUND OF THE INVENTION

1. Field of the Invention

The present invention generally relates to networks. More particularly, the present invention relates to an interface device for discovering, communicating with and controlling devices attached to a network, such as a wired or wireless residential network.

2. Background

Networks in homes and small offices are becoming increasingly popular. This is due, in large part, to an increase in the number of households and small offices having more than one personal computer (PC). Networks provide a variety of benefits to such multi-computer households and offices. For example, such networks enable the users of multiple PCs to share a common printer, to share documents and other files, and to access the Internet via a common network connection.

In light of this increasing popularity, it would be beneficial to extend home/office networks to permit communication with and control of conventional consumer electronic devices such as televisions, stereo equipment, video cassette recorders (VCRs) and digital video disk (DVD) players. However, the vast majority of consumer electronic devices employ infra-red ("IR") communication as a means of remote device control. Alternatively, serial communication and radio frequency (RF) protocols are used. Unfortunately, these modes of communication are not compatible with packet-based communication protocols, such as TCP/IP, that are used for communication over many home/office networks.

It would also be beneficial to enable conventional consumer electronic devices to advertise themselves to devices on a home/office network and to publish command sets by which they can be controlled. Modem device discovery and control protocols such as the Universal Plug and Play (UPnP) protocol may be used to enable such functionality in network-attached devices. However, protocols such as UPnP require compliant products that: (a) are adapted for network connectivity and (b) possess modest computational and storage resources. Conventional consumer electronic devices such as those described above typically lack these features. Thus, consumers that wish to enable these features have little choice but to wait for protocol-compliant devices to come to market and discard their current legacy devices.

In addition to being incompatible with packet-based communication protocols and modem device discovery and control protocols, consumer electronic devices that rely on IR or serial communication protocols suffer from a number of other disadvantages. For example, the vast majority of legacy consumer electronic devices lack a feedback mechanism through which device state can be reported. Modem device discovery and control protocols such as the UPnP protocol typically allow compliant units to publish methods by which an interested network entity might query them for state information. The majority of consumer electronics, however, do not have status reporting mechanisms. For example, consumer IR, which is the dominant form of IR communication, is largely uni-directional.

Also, in order to control consumer electronic devices that rely on IR communication, IR transmitters (also known as "remotes") must be placed within a very short range of a target device, and transmission paths must be free of obstructions, including physical barriers such as walls. The requirement of close physical proximity and a clear line-of-sight places severe limitations on the manner in which consumer electronic devices that rely on IR may be controlled.

What is desired, then, is a device that allows legacy consumer electronic devices to be controlled via a network, such as a wired or wireless residential network. To this end, the desired device should translate between packet-based communication protocols, such as TCP/IP, and communication protocols used by legacy consumer electronic devices, such as IR and serial protocols.

The desired device should also link the world of modem device discovery and control protocols (such as the UPnP protocol) to the world of legacy devices. For example, the desired device should provide UPnP control and management functionality to legacy devices, while permitting additional "true" UPnP devices to be added to a network as they become available.

The desired device should also be able to determine or deduce the state of one or more legacy consumer electronic devices. The desired device should then be able to publish this state information to interested network entities.

The desired device should further allow control of legacy devices through a network, thereby obviating the use of traditional direct line-of-sight IR controllers. Consequently, a user of the desired device should not need to be in the same room as or have a clear path to the devices that he or she wishes to control. The desired device should thus provide true "remote" control.

BRIEF SUMMARY OF THE INVENTION

The present invention is directed to a legacy device bridge that enables consumer electronic devices to be controlled via a network, such as a wired or wireless residential network. In an embodiment, the legacy device bridge translates between packet-based communication protocols, such as TCP/IP, and communication protocols used by legacy consumer electronic devices, such as IR and serial protocols, in order to perform this function.

The present invention is also directed to a virtualization appliance that links the world of modem device discovery and control protocols, such as the UPnP protocol, to the world of legacy devices. In an embodiment, the virtualization appliance provides UPnP control and management functionality to legacy devices, and also permits native UPnP devices to be added to a network as they become available.

The present invention is further directed to a legacy device bridge that extracts state information concerning legacy consumer electronic devices and provides that information to interested network devices. In an embodiment, the legacy device bridge uses probes to extract environmental information from which the state of one or more legacy consumer electronic devices may be determined. State information is then reported to interested network entities.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
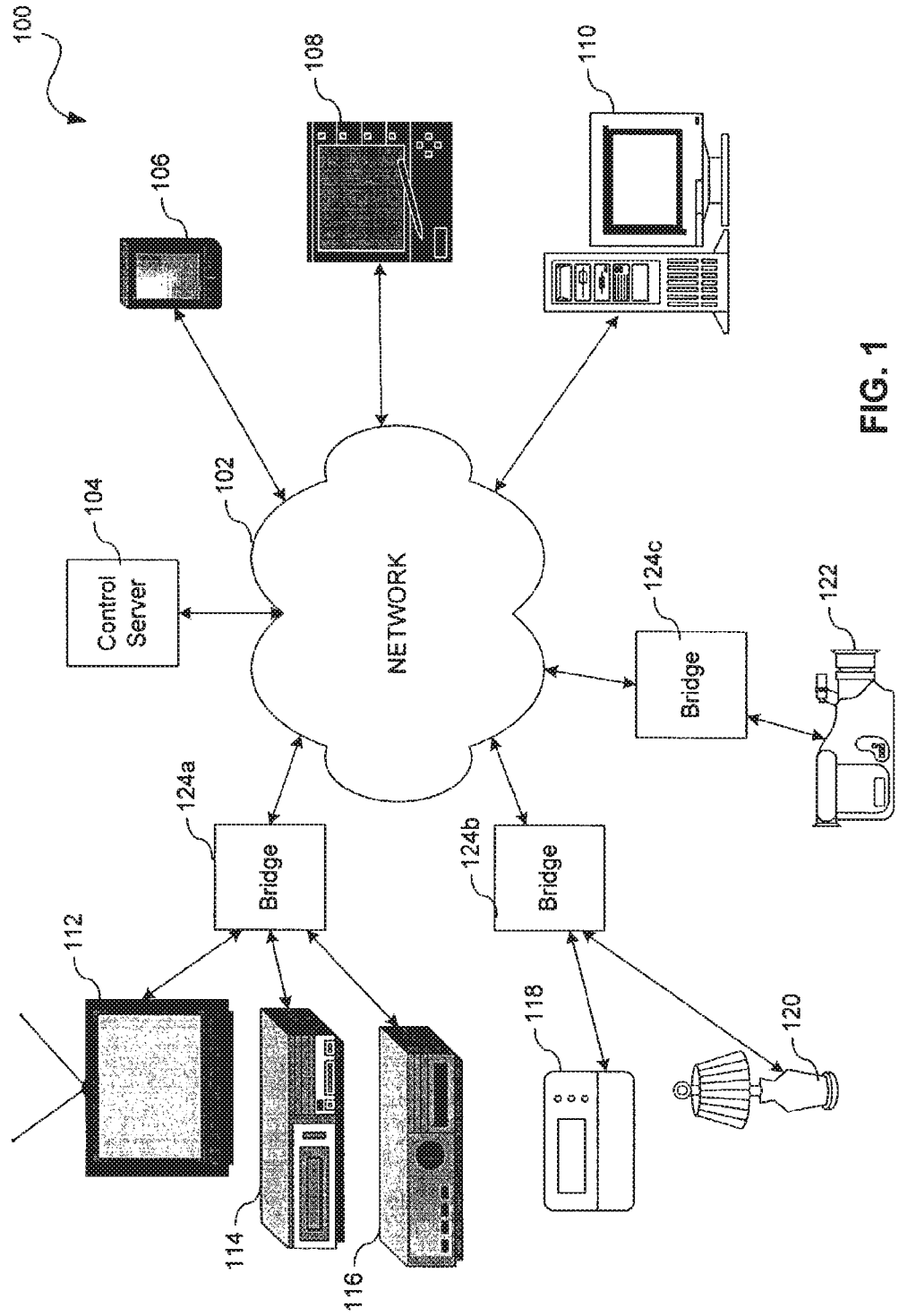
FIG. 1 depicts an example environment in which an embodiment of the present invention may operate.

The features and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE INVENTION

A. Overview

A legacy device bridge for use in a network, such as a wired or wireless residential network, is provided. As will be described in more detail herein, the legacy device bridge performs protocol conversion to enable a network-attached entity that uses a packet-based communication protocol to communicate with and control legacy devices, such as consumer electronics, that rely exclusively on infrared (IR) or serial communication protocols. The legacy device bridge also performs a virtualization function that allows legacy devices to be advertised to the network as devices that comply with a packet-based discovery and control protocol, such as the Universal Plug and Play (UPnP) protocol, and to be controlled as such. The legacy device bridge is also adapted to probe, deduce and publish information relating to the state of a legacy device to other entities on the network.

B. Example Operating Environment

FIG. 1 depicts an example environment 100 in which embodiments of the present invention can operate. It should be understood that example operating environment 100 is shown for illustrative purposes only and does not limit the present invention. Other implementations of example operating environment 100 will be apparent to persons skilled in the relevant art(s) based on the teachings contained herein, and the invention is directed to such other implementations.

As depicted in FIG. 1, example operating environment 100 includes a plurality of devices that are communicatively connected to a network 102. In an embodiment, network 102 comprises a residential network for communicatively connecting devices within a home. In accordance with such an embodiment, network 102 may comprise, for example, a home phone line network, a home power line network, an Ethernet network, a wireless network, or any combination of the above. However, the invention is not limited to residential networks, and network 102 may comprise any type of residential or non-residential network, including but not limited to a local area network (LAN) or a wide-area network (WAN), such as the Internet.

As will be described in more detail below, network 102 comprises one or more legacy device bridges 124a, 124b and 124c in accordance with the present invention. These legacy device bridges facilitate communication between devices adapted for communication in accordance with a packet-based communication protocol, such as TCP/IP, and legacy consumer electronic devices that are not so adapted. Devices adapted for communication in accordance with a packet-based communication protocol can include, for example, a personal digital assistant (PDA) 106, a tablet PC 108, and/or a PC-based computer system 110. Legacy consumer electronic devices that are not so adapted, and that may rely on, for example, IR or serial communication protocols, can include a television 112, a VCR and/or DVD player 114, a stereo receiver 116, an electronic thermostat 118, a lamp 120, and/or a video camera 122. These examples are not intended to be limiting, however, and an embodiment of the present invention may be used to facilitate communication between legacy and non-legacy devices other than those shown in FIG. 1.

In accordance with example operating environment 100, centralized control of network 102 and the various entities connected thereto is provided by a control server 104. In particular, control server 104 manages communication between and provides shared resources to various entities attached to network 102. Controllers, which can include, for example PDA 106, tablet PC 108, and/or PC-based computer system 110, permit a user to interface with control server 104 and control the function of other devices and/or applications coupled to network 102, such as television 112, VCR and/or DVD player 114, stereo receiver 116, electronic thermostat 118, lamp 120, and/or video camera 122.

A more detailed example of control server 104, controllers, and a network that provides centralized command and control of devices and applications in residential or non-residential environment may be found in commonly owned, co-pending U.S. patent application Ser. No. 10/180,500, entitled "Method, System, and Computer Program Product for Managing Controlled Residential or Non-residential Environments," the entirety of which is incorporated by reference herein. As will be appreciated by persons skilled in the relevant art(s) based on the teachings provided herein, a legacy device bridge in accordance with an embodiment of the present invention may advantageously be used to implement controlled residential and non-residential environments as disclosed in that application.

However, as stated above, example operating environment 100 is shown for illustrative purposes only and does not limit the present invention. Accordingly, embodiments of the present invention may also be used in a de-centralized network environment, such as an environment without a centralized control server 104. For example, an embodiment of the present invention may operate in a network environment in which network control and management functionality is distributed among one or more legacy device bridges, thereby forming a peer-to-peer network.

Figure 2:
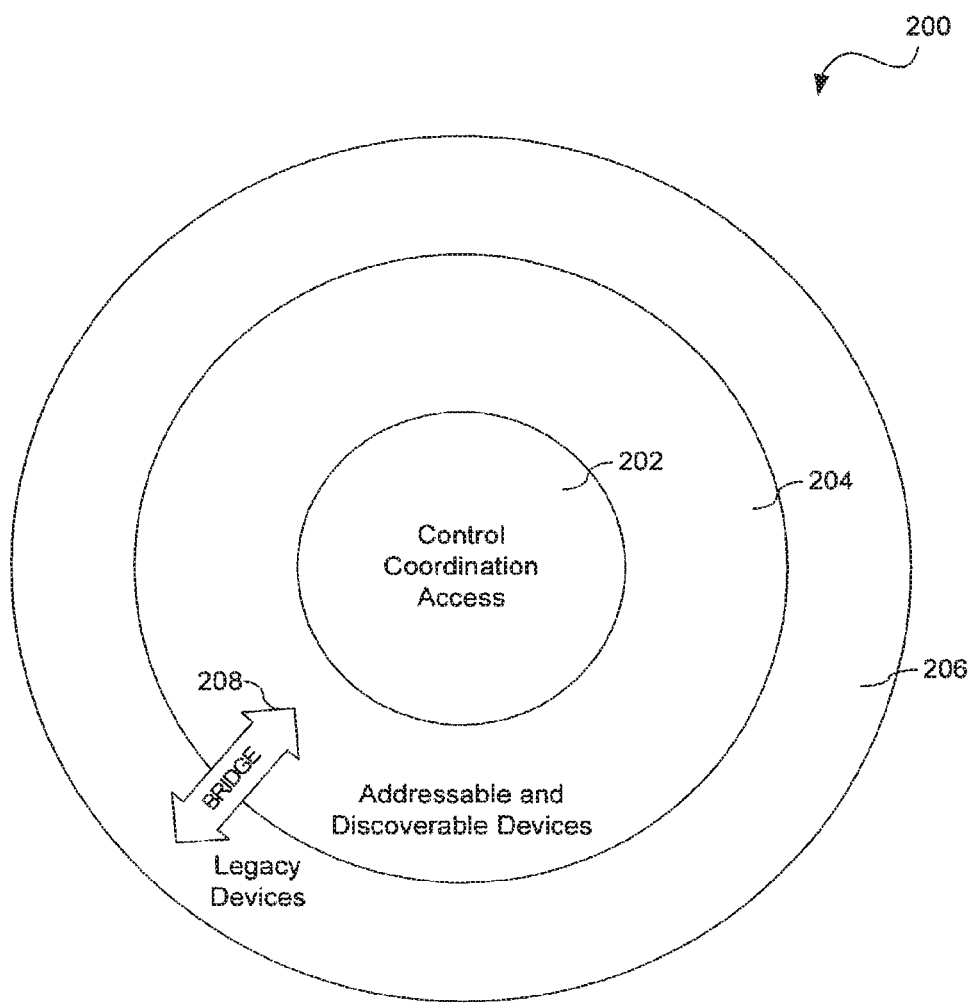
FIG. 2 is a conceptual drawing of the physical structure of an exemplary operating environment that includes a legacy device bridge in accordance with an embodiment of the present invention.

FIG. 2 is a conceptual drawing of the physical structure of an exemplary operating environment 200 that includes a legacy device bridge 208 in accordance with an embodiment of the present invention. As shown in FIG. 2, the exemplary operating environment includes a centralized control system 202, a first level of addressable and discoverable devices 204, and a second level of legacy devices 206. Control system 202 coordinates communication between and access to the various devices included within operating environment 200. In an embodiment, control system 202 is responsible for storing information pertaining to the persistent state of devices, the location of devices (such as room assignments), user preferences and control macros, and command codes for communicating with one or more devices.

Addressable and discoverable devices 204 comprise one or more devices that are communicatively coupled to control system 202 via a network, such as a residential network, and that are adapted to be assigned a network address and discovered and controlled by other devices on the network. In accordance with an embodiment of the present invention, addressable and discoverable devices 204 are adapted for compliance with a packet-based discovery and control protocol, such as the UPnP protocol. Addressable and discoverable devices 204 may comprise, for example, one or more UPnP-compliant PCs, peripherals, intelligent appliances, and/or wireless devices.

Legacy devices 206 comprise devices that can be controlled within operating environment 200, but which are not specially adapted for discovery and control by other devices on the network. In accordance with an embodiment of the present invention, legacy devices 206 comprise conventional consumer electronic devices that rely on IR or serial communication and control protocols, and that are not compliant with a packet-based discovery and control protocol, such as the UPnP protocol. Legacy devices 206 may comprise, for example, one or more televisions, VCRs, DVD players, stereo receivers and/or other audio equipment, video cameras, thermostats, or lamps.

As shown in FIG. 2, legacy device bridge 208 comprises an interface between addressable and discoverable devices 204 and legacy devices 206. As will be described in more detail herein, legacy device bridge 208 performs this function by converting between a packet-based communication protocol, such as TCP/IP, and IR or serial-based communication protocols.

As will also be described herein, in an embodiment, legacy device bridge 208 further provides a virtual representation of each of legacy devices 206 to addressable and discoverable devices 204 and central controller 202, thereby causing legacy devices 206 to appear on the network as addressable and discoverable devices that comply with a packet-based discovery and control protocol, such as the UPnP protocol, and to be controlled as such. In an alternate embodiment, central controller 202 performs the function of providing a virtual representation of each of legacy devices 206 to addressable and discoverable devices 204.

Finally, as will also be described herein, in an embodiment, legacy device bridge 208 is also adapted to probe, deduce and report information relating to the state of legacy devices 206 to other entities on the network. In a further embodiment, legacy device bridge 208 also stores state information pertaining to legacy devices 206.

Figure 3:
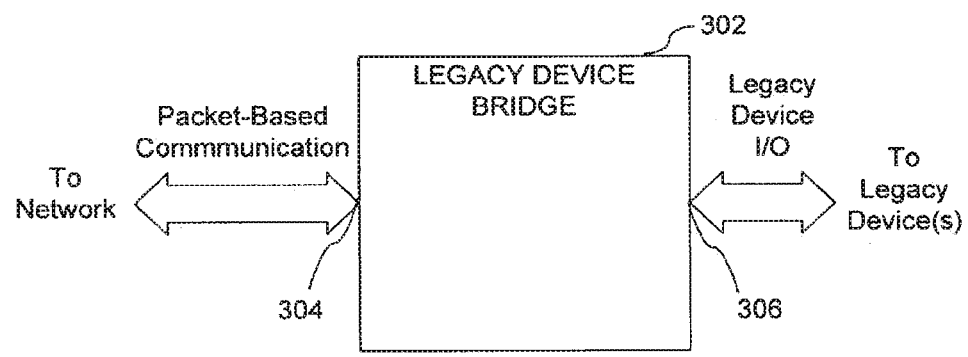
FIG. 3 illustrates a legacy device bridge in accordance with an embodiment of the present invention.

C. Legacy Device Bridge in Accordance with Embodiments of the Present Invention FIG. 3 illustrates an example legacy device bridge 302 in accordance with an embodiment of the present invention. As shown in FIG. 3, legacy device bridge 302 comprises at least one network interface 304 for communicating with devices on a network using a packet-based communication protocol, such as TCP/IP, and at least one legacy device interface 306 for communicating with legacy devices using, for example, an IR or serial communication protocol. In an embodiment, network interface 304 comprises a wireless transceiver adapted for communication over a wireless local area network (WLAN) in accordance with the IEEE 802.11b communication protocol, or any of the other IEEE 802.11 protocols, including but not limited to the 802.11, 802.11a, 802.11b or 802.11g protocols. In accordance with such an embodiment, network connectivity is achieved by situating legacy device bridge 302 in a location that is within the effective range of a wireless network access point.

In an embodiment, legacy device bridge 302 comprises an IP-addressable device that is adapted to use standard Internet protocols such as Dynamic Host Configuration Protocol (DHCP) to automatically configure itself for network communication. Accordingly, other network entities can communicate with legacy device bridge 302 via network interface 304 by using the IP address assigned to legacy device bridge 302. As will be discussed in more detail below, legacy device bridge 302 may also use a device discovery and control protocol, including but not limited to the UPnP protocol, to advertise its presence to other entities on the network and to publish command sets for legacy devices that it controls.

Figure 4:
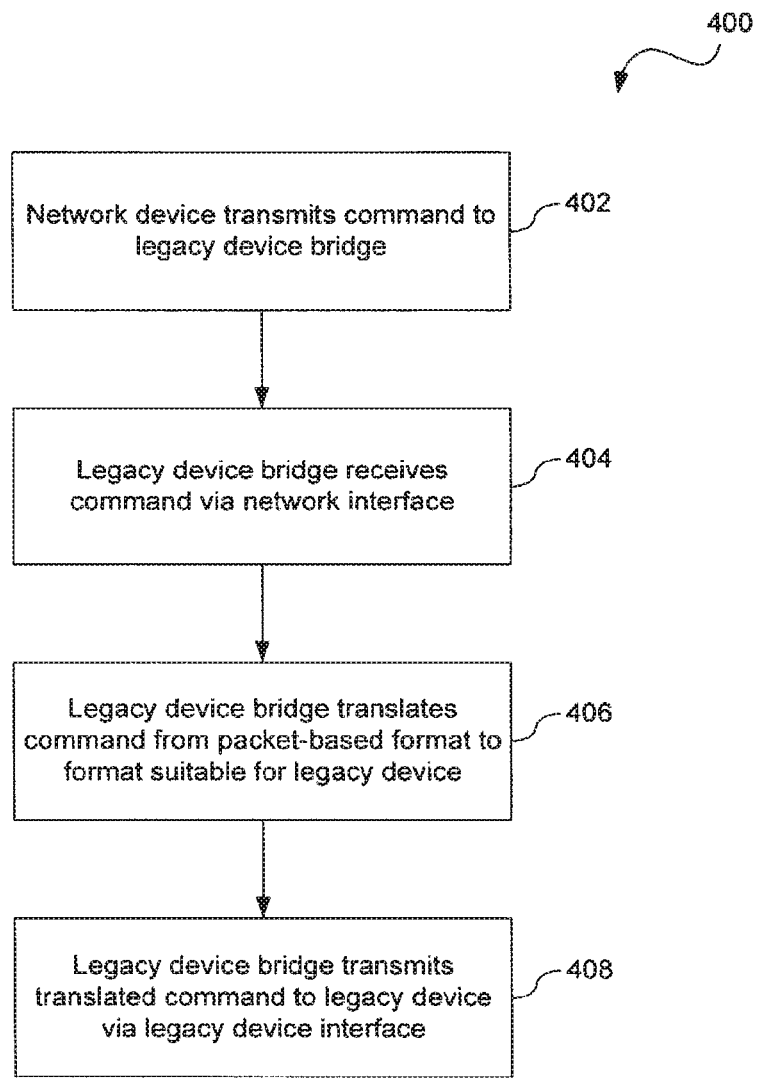
FIG. 4 depicts a flowchart of a method for controlling legacy devices using a legacy device bridge in accordance with an embodiment of the present invention.

FIG. 4 depicts a flowchart 400 of a method for controlling legacy devices, such as conventional consumer electronic devices, using a legacy device bridge in accordance with an embodiment of the present invention. The invention, however, is not limited to the description provided by the flowchart 400. Rather, it will be apparent to persons skilled in the relevant art(s) from the teachings provided herein that other functional flows are within the scope and spirit of the present invention. The flowchart 400 will be described with continued reference to the exemplary legacy device bridge 302 of FIG. 3, although the invention is not limited to that embodiment.

The method of flowchart 400 begins at step 402, in which a network device, which is adapted for communication in accordance with a packet-based communication protocol, sends a command to control a legacy device to legacy device bridge 302. Commands can originate from anywhere in the network, which may include locations physically distant from legacy device bridge 302. At step 404, legacy device bridge 302 receives the command via network interface 304. At step 406, legacy device bridge 302 translates the received command from a packet-based communication protocol to a protocol suitable for receipt by the legacy device, such as an IR protocol or a serial protocol. This translation function may be executed in software, hardware, or a combination thereof. At step 408, legacy device bridge 302 transmits the translated command via legacy device interface 306 to the legacy device for which it is intended.

Figure 5A:
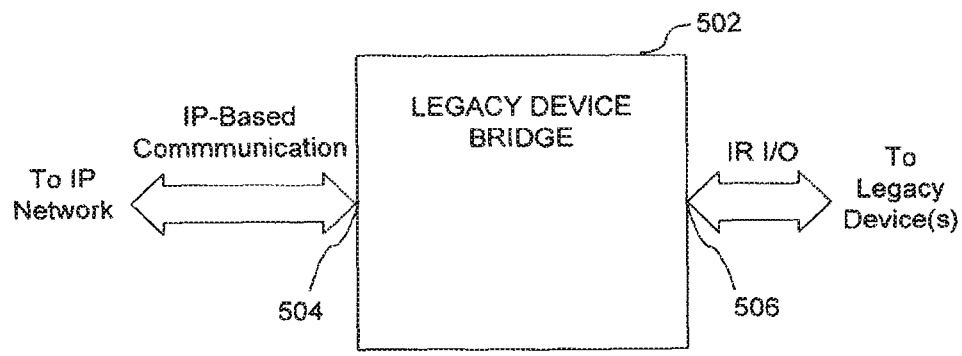
FIGS. 5A, 5B and 5C illustrate examples of a legacy device bridge in accordance with various embodiments of the present invention.
Figure 5B:
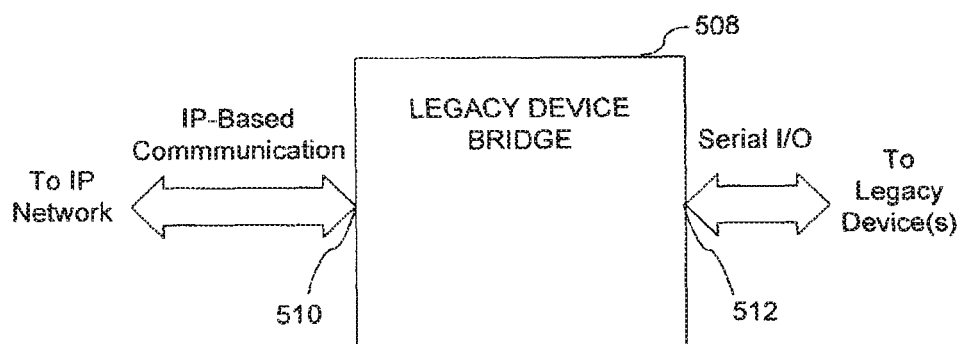
Figure 5C:
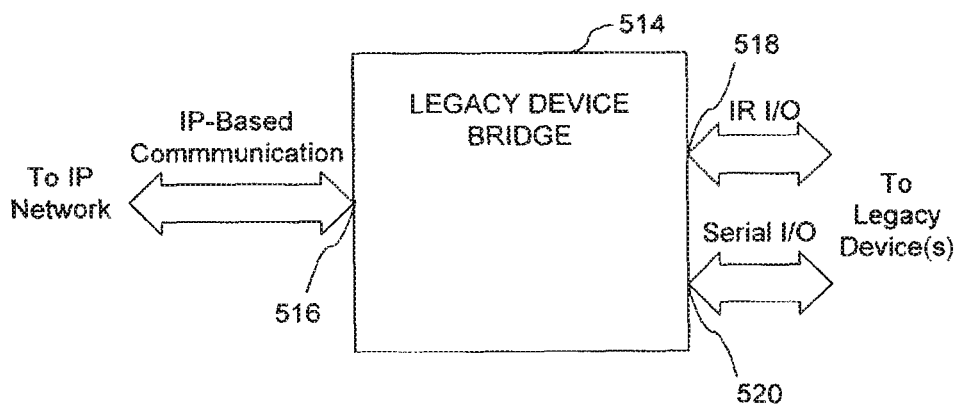

FIGS. 5A, 5B and 5C illustrate further examples of a legacy device bridge in accordance with various embodiments of the present invention. For example, FIG. 5A depicts a legacy device bridge 502 that includes an IP network interface 504 for communicating with devices on an IP network and an IR interface 506 for communicating with legacy devices using an IR communication protocol. Legacy device bridge 502 converts IP-based commands received via IP network interface 504 into a series of IR pulses which are then transmitted over IR interface 506 to a legacy device. In an embodiment, legacy device bridge 502 includes multiple IR interfaces 506 for communicating with multiple legacy devices.

In an embodiment, IR interface 506 comprises an IR transmitter adapted for wireless one-way communication with IR-capable legacy devices. In an alternate embodiment, IR interface 506 comprises an IR transmitter/receiver pair, or IR transceiver, adapted for wireless two-way communication with IR-capable legacy devices. In accordance with these embodiments, wireless IR communication with a legacy device is achieved by situating legacy device bridge 502 in a location that is along a clear line-of-sight path to and within a certain predefined transmission range of the legacy device.

In an alternate embodiment, IR interface 506 comprises an interface adapted for wired communication with a legacy device by means of, for example, an IR dongle. In accordance with this alternate embodiment, legacy device bridge 502 need not be situated in any particular location for effective communication with the legacy device.

FIG. 5B depicts a legacy device bridge 508 that includes an IP network interface 510 for communicating with devices on an IP network and a serial interface 512 for communicating with legacy devices using a serial communication protocol. Legacy device bridge 508 converts IP-based commands received via IP network interface 510 into a serial data stream which is then transmitted over serial interface 512 to a legacy device. In an embodiment, legacy device bridge 508 includes multiple serial interfaces 512 for communicating with multiple legacy devices.

In an embodiment, serial interface 512 comprises a Universal Serial Bus (USB) interface for communicating in accordance with the USB protocol. In an alternate embodiment, serial interface 512 comprises an RS-232 interface for communicating in accordance with the RS-232 protocol. However, these examples are not intended to be limiting and other serial communication protocols may be used.

FIG. 5C depicts a legacy device bridge 514 that includes an IP network interface 516 for communicating with devices on an IP network, an IR interface 518 for communicating with legacy devices using an IR communication protocol, and a serial interface 520 for communicating with legacy devices using a serial communication protocol. Legacy device bridge 514 converts IP-based commands received via IP network interface 516 into a series of IR pulses which are then transmitted over IR interface 518 to a legacy device. Legacy device bridge 514 also converts IP-based commands received via IP network interface 516 into a serial data stream which is then transmitted over serial interface 520 to a legacy device. In an embodiment, legacy device bridge 514 includes multiple IR interfaces 518 for communicating with multiple legacy devices and/or multiple serial interfaces 520 for communicating with multiple legacy devices.

1. Remote Storage and Transmission of Legacy Device Control Codes

In accordance with an embodiment of the present invention, network devices generate commands from a common set of high-level commands, such as "power on" and "power off," to control legacy devices connected to the network via a legacy device bridge. These high-level commands are then mapped to low-level IR or serial control codes unique to each legacy device. In an embodiment, the IR or serial control codes for each legacy device are stored in the legacy device bridge that controls the device, and the legacy device bridge performs the necessary function of mapping high-level commands to low-level commands.

Alternatively, low-level IR or serial control codes are stored in a device other than the legacy device bridge. For example, in order to minimize the storage resources required to implement the legacy device bridge, low-level IR or serial control codes can be stored in a more powerful network device, such as a server located on the network. This mechanism of storing the low-level control codes in a single location has the added advantage of allowing for easy updates of those codes, as opposed to storing a copy of the low-level control codes in every network device that can operate as a controller of the legacy device.

Figure 6:
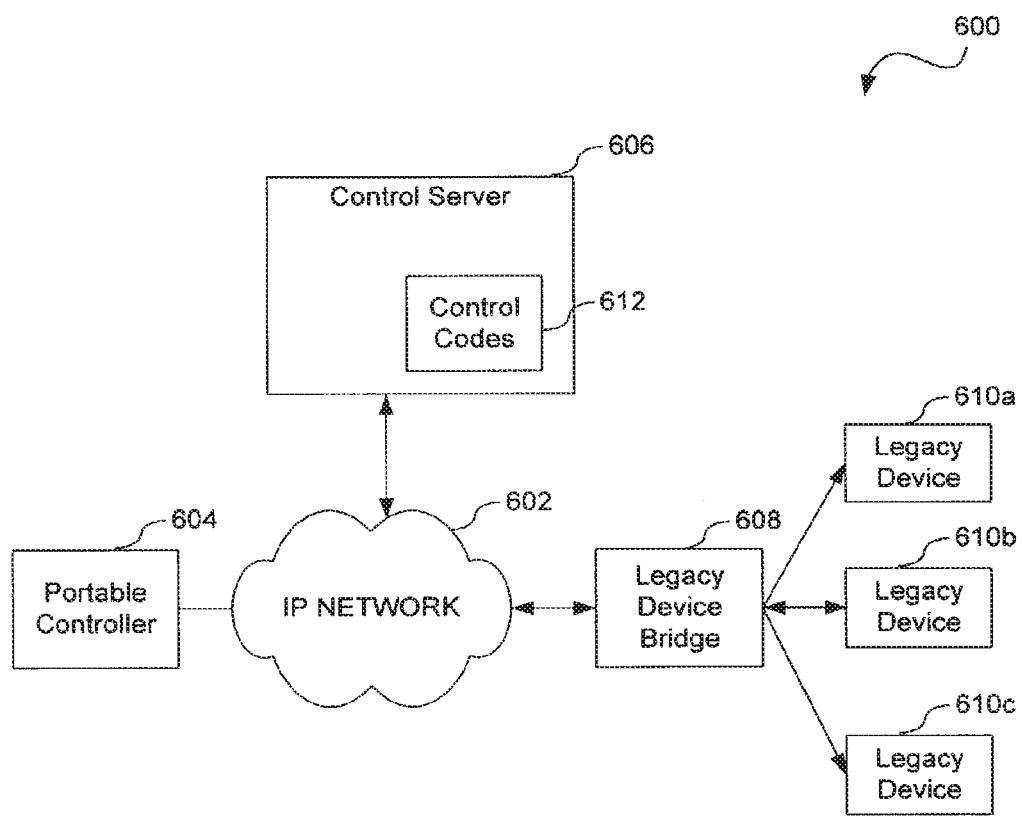
FIG. 6 illustrates a network system that provides for remote storage of legacy device codes in accordance with such an embodiment of the present invention.

FIG. 6 illustrates a network system 600 that provides for remote storage of legacy device codes in accordance with such an embodiment of the present invention. Network system 600 includes a controller 604, which may comprise for example a handheld controller or a PC, a control server 606, and a legacy device bridge 608, each of which is communicatively coupled to an IP network 602. Legacy device bridge 608 is also in communication with legacy devices 610a, 610b and 610c. The low-level IR or serial control codes 612 necessary for controlling legacy devices 610a-610c are stored in control server 606. Control server 606 may also store other low-level IR or serial control codes necessary for controlling legacy devices connected to IP network 602 via other legacy device bridges (not shown in FIG. 6).

These low-level IR or serial control codes may be provided to the control server 606 using a variety of techniques. In an embodiment, a user manually enters the control codes into legacy device bridge 608, or some other network entity, and they are then uploaded to control server 606. In an alternate embodiment, legacy device bridge 608 is configured to obtain the control codes from a legacy device through an automatic process, such as two-way IR queries between legacy device bridge 608 and the legacy device, and then to upload the control codes to control server 606.

Figure 7:
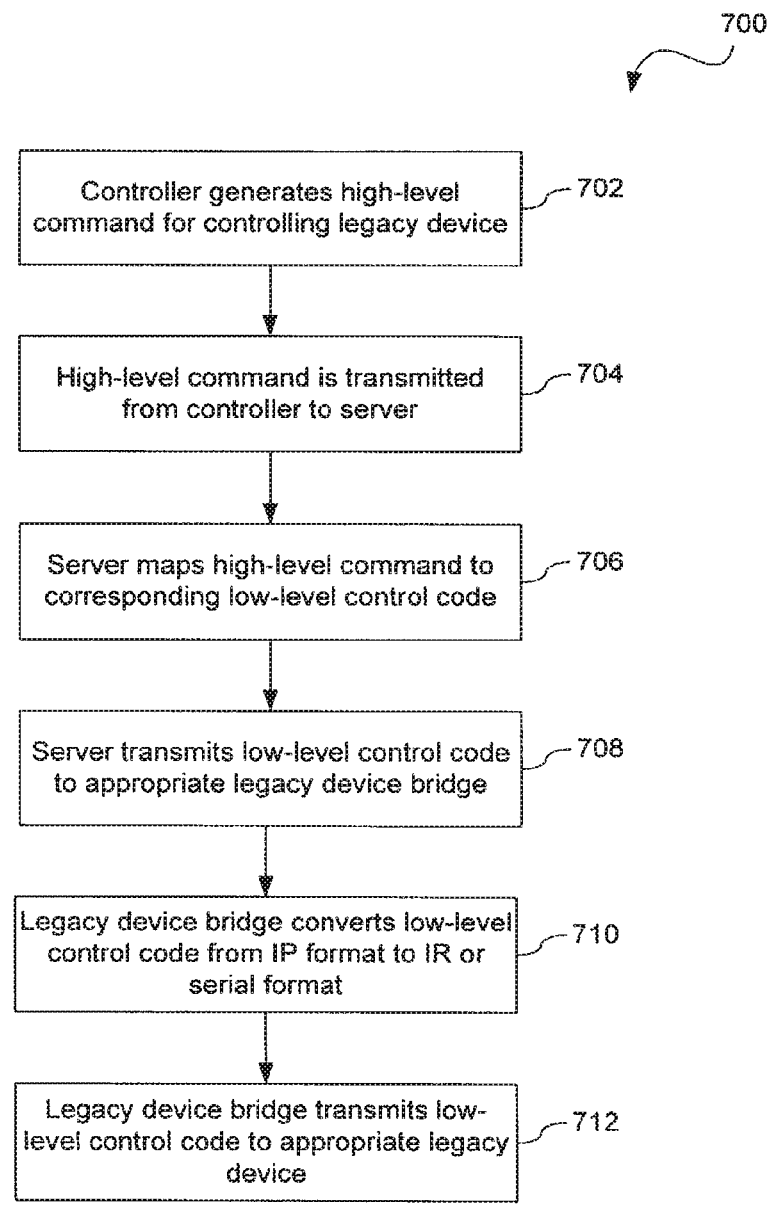
FIG. 7 depicts a flowchart of a method for controlling legacy devices using a legacy device bridge in accordance with an embodiment of the present invention, wherein legacy device control codes are stored remotely.

FIG. 7 depicts a flowchart 700 of a method for controlling legacy devices using a legacy device bridge in accordance with an embodiment of the present invention, wherein legacy device codes are stored remotely. The invention, however, is not limited to the description provided by the flowchart 700. Rather, it will be apparent to persons skilled in the relevant art(s) from the teachings provided herein that other functional flows are within the scope and spirit of the present invention. The flowchart 700 will be described with continued reference to network system 600 of FIG. 6, although the invention is not limited to that embodiment.

The method of flowchart 700 begins at step 702, in which portable controller 604 generates a high-level command for controlling one of legacy devices 610a-610c. For the purposes of this example, we will assume that portable controller generates a high-level command for controlling legacy device 610a. The high-level command may be selected from a predefined list of high-level commands that are stored by portable controller 604, or which are made available to portable controller by control server 606, legacy device bridge 608, or some other entity on network 602.

At step 704, portable controller 604 transmits the high-level command to control server 606 over IP network 602. At step 706, control server 606 receives the high-level command and maps it to a corresponding one of the low-level serial or IR control codes for controlling legacy device 610a, which are stored in control server 606. At step 708, control server 606 transmits the corresponding low-level serial or IR control code to the appropriate legacy device bridge 608. At step 710, legacy device bridge 608 converts the low-level control code, which has been transmitted to it in an IP format, to an appropriate format for transmission to legacy device 610a, such as to a series of IR pulses or a serial stream of data. At step 712, legacy device bridge transmits the low-level control code to the appropriate legacy device 610a.

2. Position Finding in Indoor Environments

In accordance with an embodiment of the invention, the legacy device bridge may be configured to serve as an IR beacon for providing location awareness information. For example, the legacy device bridge may be configured to serve as an IR beacon for identifying the location of a handheld controller within a controlled residential environment. Such location awareness information may then be used by a network entity, such as a central server, to reconfigure the handheld controller for command and control of selected devices within a certain vicinity of the handheld controller.

A more complete description of the use of location awareness information for managing controlled environments may be found in commonly owned, co-pending U.S. patent application Ser. No. 10/180,500, entitled "Method, System, and Computer Program Product for Managing Controlled Residential or Non-residential Environments," the entirety of which is incorporated by reference herein. As will be appreciated by persons skilled in the relevant art(s) based on the teachings provided herein, a legacy device bridge in accordance with an embodiment of the present invention may advantageously be used to implement controlled residential and non-residential environments as disclosed in that application.

In an embodiment, the legacy device bridge is equipped with an IrDA (Infrared Data Association) beacon for providing location awareness information. Given the short range of IR pulses, IrDA beacons are an efficient way of providing coarse-granularity position finding in an indoor environment. In accordance with such an embodiment, the legacy device bridge is programmed to emit a set of infrared pulses that uniquely identifies the bridge to handheld controllers which are communicatively coupled to a network. These codes can then be mapped to, or associated with, room locations by a central server coupled to the network, or, alternatively, a mapping table can be stored in the handheld controller for performing this function.

In an embodiment, the IR beacon pulse is run-time configurable as is the beacon frequency. For example, the legacy bridge device can emit an identifier (ID) that conforms to standard IR data transfer protocols such as IrDA. In an embodiment, the legacy device bridge transmits an ID that corresponds to its globally unique MAC (media access code) address.

Figure 8:
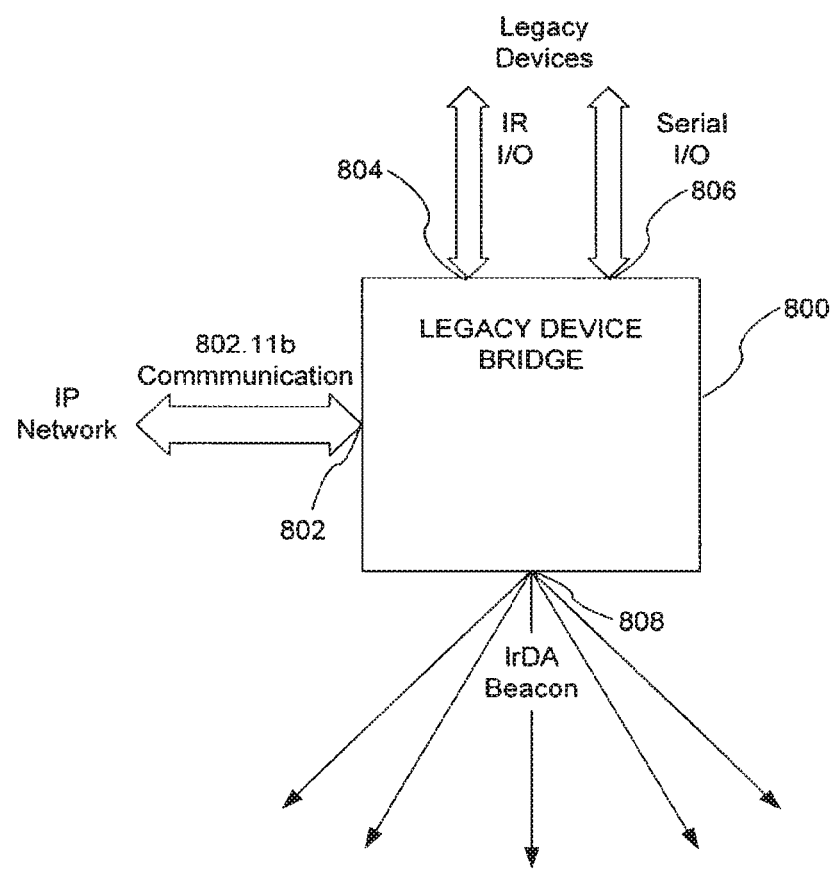
FIG. 8 depicts a legacy device bridge in accordance with an embodiment of the present invention that includes an IR beacon for providing location awareness information.

FIG. 8 depicts a legacy device bridge 800 in accordance with an embodiment of the present invention that includes an IR beacon for providing location awareness information. As shown in FIG. 8, legacy device bridge 800 includes a wireless interface 802, such as an 802.11b transceiver, for providing wireless connectivity to an IP network, one or more IR interfaces 804 for communicating with IR-enabled legacy devices, one or more serial interfaces 806 for communicating with serial-enabled legacy devices, and an IrDA beacon 808. In accordance with this embodiment, legacy device bridge 800 must be positioned so that there is a clear transmission path between IrDA beacon 808 and mobile controllers passing within its vicinity, thereby ensuring that the mobile controllers can receive signals transmitted by IrDA beacon 808.

Figure 9:
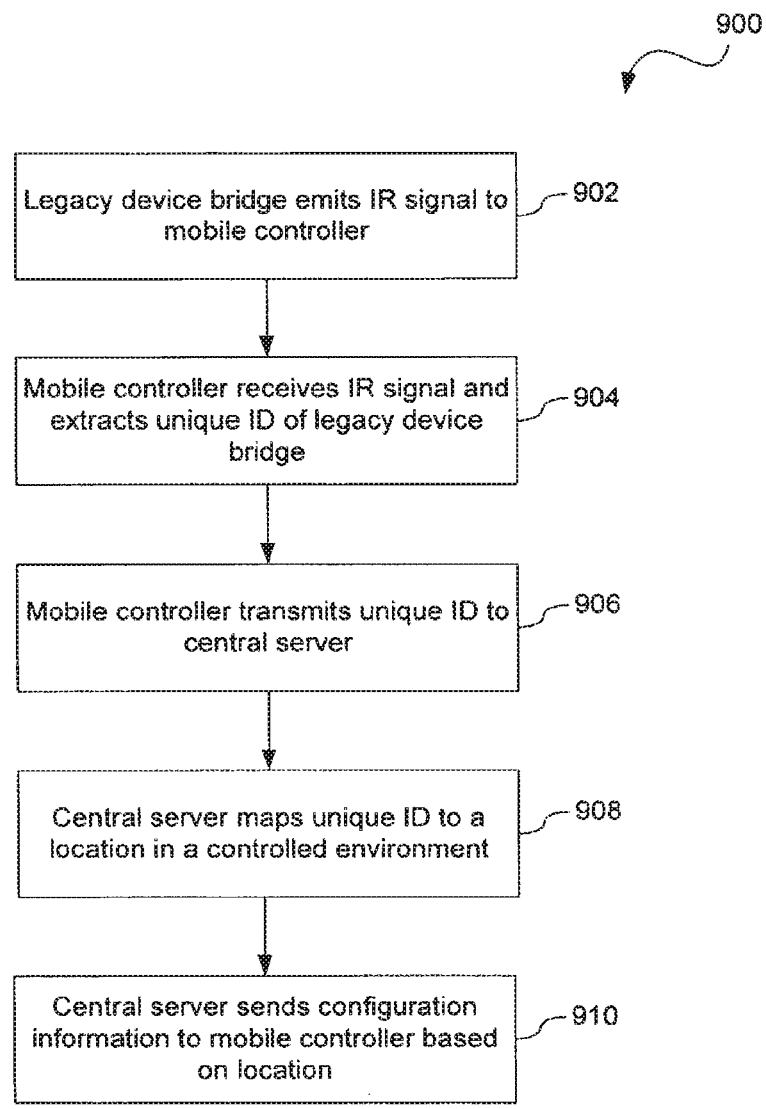
FIG. 9 depicts a flowchart of a method for using a legacy device bridge for providing location awareness information in accordance with an embodiment of the present invention.

FIG. 9 depicts a flowchart 900 of a method for using a legacy device bridge for providing location awareness information in accordance with an embodiment of the present invention. The invention, however, is not limited to the description provided by the flowchart 900. Rather, it will be apparent to persons skilled in the relevant art(s) from the teachings provided herein that other functional flows are within the scope and spirit of the present invention.

The method of flowchart 900 begins at step 902, in which a legacy device bridge emits an IR signal to a mobile controller, wherein the IR signal comprises a unique ID assigned to the legacy device bridge. As discussed above, the IR signal may be emitted by an IrDA beacon which comprises part of the legacy device bridge. At step 904, the mobile controller receives the IR signal and extracts the unique ID of the legacy device bridge therefrom. At step 906, the mobile controller transmits the unique ID to a central server over an IP network. At step 908, the central server maps the unique ID to a given location within a controlled environment. In an embodiment, this mapping function is performed by accessing a table stored by the central server that maps legacy device bridges to locations within the controlled environment. At step 910, the central server sends configuration information to the mobile controller based on the location identified in step 908. This configuration information is used to reconfigure the mobile controller for the command and control of selected devices within a certain vicinity of the location identified in step 908.

In an alternate embodiment of the method of flowchart 900, the mobile controller performs the function of mapping the unique ID to a given location within a controlled environment. In accordance with this alternate embodiment, the mobile controller transmits an identified location to the central server, and the central server sends configuration information to the mobile controller based on the identified location.

3. Stateful Binding of Stateless Devices

A legacy device bridge in accordance with an embodiment of the present invention is configured to prevent communication between the legacy device bridge and more than one control server, such as control server 104. This could occur, for example, where multiple control servers are sharing, either advertently or inadvertently, a wireless network (for example, in a WLAN, they share the same SSID (Service Set Identifier)). Such an overlap may expose a network-controlled environment to undesired outside control, such as control by a neighbor.

In an embodiment, the legacy device bridge avoids this problem by storing the network address of the first control server that contacts the bridge after it is connected to the network. Then, future incoming packets received from any other address are discarded. In an alternate embodiment, the address of the control server is configured out-of-band. For example, the address of the control server may be provided to the legacy device bridge using IR or serial communication with a corresponding IR or serial interface. After the address has been so configured, incoming packets received from any other address are discarded.

4. Miscellaneous Features

In an embodiment of the present invention, the legacy device bridge is adapted to act as a room controller. In accordance with such an embodiment, the legacy device bridge is adapted as follows:

The legacy device bridge is adapted to automatically configure itself in most home networking environments, although some cases may require direct user intervention in order to configure the bridge.

To facilitate ease of use, the legacy device bridge is adapted for IrDA out-of-band configuration. For example, the legacy device bridge can be programmed to accept network configuration parameters from an IR port using industry-standard data transmission protocols.

The legacy device bridge is adapted to learn new legacy device codes, such as IR or serial control codes. For example, although a sizable body of IR codes exist in commercial databases, the broad range of available consumer electronic devices make claims of absolute compatibility difficult. Thus, in order to guarantee interoperability with legacy consumer electronic devices, a legacy device bridge in accordance with an embodiment of the present invention is adapted to be placed in a state where it can receive and store new IR or serial control codes. In an embodiment, the IR or serial control codes may be transmitted by another device, such as an IR remote control device. The legacy device bridge may store learned codes internally or upload them to a server on the network for storage.

Cost is a major factor for the design a legacy device bridge in accordance with the present invention. Accordingly, in an embodiment, software is used to perform functions typically assigned to hardware, thereby reducing overall part-count. For example, in an embodiment, consumer IR signals for communicating with legacy devices and IrDA signals for providing location awareness information are multiplexed onto a single IR emitter/receiver pair.

D. Method for Legacy Device Virtualization, Advertisement and Control in Accordance with Embodiments of the Present Invention A legacy device bridge in accordance with an embodiment of the present invention comprises a virtualization appliance that enables a legacy device, such as a conventional consumer electronic device, to be advertised to and controlled by network-connected elements as if the legacy device were compliant with a packet-based discovery and control protocol, such as UPnP. As will be appreciated by persons skilled in the relevant art(s), UPnP is an open industry standard that uses Internet and Web protocols to enable devices such as PCs, peripherals, intelligent appliances, and wireless devices to be connected to a network and to become automatically aware of each other. In accordance with UPnP, when a user plugs a device into the network, the device configures itself, acquires a TCP/IP address, and uses a discovery protocol based on the Hypertext Transfer Protocol (HTTP) to announce its presence to other devices on the network. Other UPnP-compliant network entities may then negotiate a communication protocol with the device, determine its capabilities, and control it.

In accordance with an embodiment of the present invention, the legacy device bridge acts as a UPnP proxy for a piece of legacy equipment. The bridge advertises itself to other network entities as a UPnP device, exhibiting attributes similar to the legacy device it is masquerading as. When UPnP commands arrive from the network, the legacy device bridge translates them into an appropriate set of commands for controlling the legacy device, such as IR commands or serial commands. Note that although this embodiment is described with respect to UPnP virtualization, the present invention is not limited to UPnP virtualization, but also encompasses legacy device virtualization in accordance with other packet-based discovery and control protocols, including but not limited to Jini™, developed by Sun Microsystems of Santa Clara, Calif., or the Rendezvous™ protocol, which is an open protocol developed, in part, by Apple Computer, Inc. of Cupertino, Calif.

Figure 10:
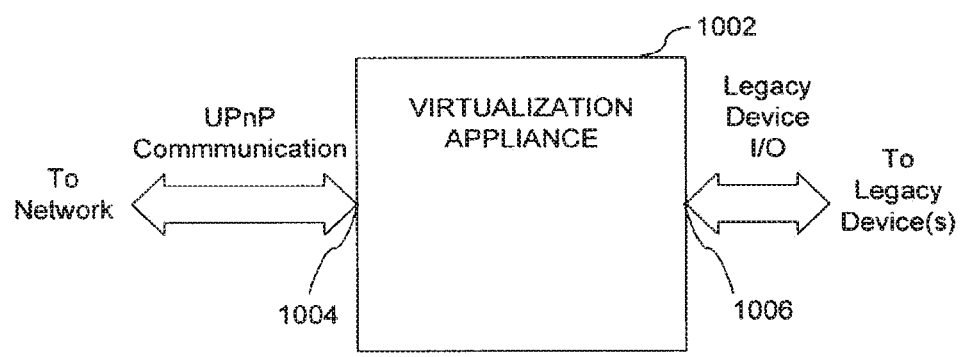
FIG. 10 illustrates a legacy device virtualization appliance in accordance with an embodiment of the present invention.

FIG. 10 illustrates a legacy device virtualization appliance 1002 in accordance with an embodiment of the present invention. As shown in FIG. 10, virtualization appliance 1002 comprises at least one network interface 1004 for communicating with devices on a network using a packet-based discovery and control protocol, such as UPnP, and at least one legacy device interface 1006 for communicating with legacy devices using, for example, an IR or serial communication protocol. In an embodiment, network interface 1004 comprises an 802.11b wireless transceiver adapted for communication with IP networks. In accordance with such an embodiment, network connectivity is achieved by situating virtualization appliance 1002 in a location that is within the effective range of a wireless network access point.

Figure 11:
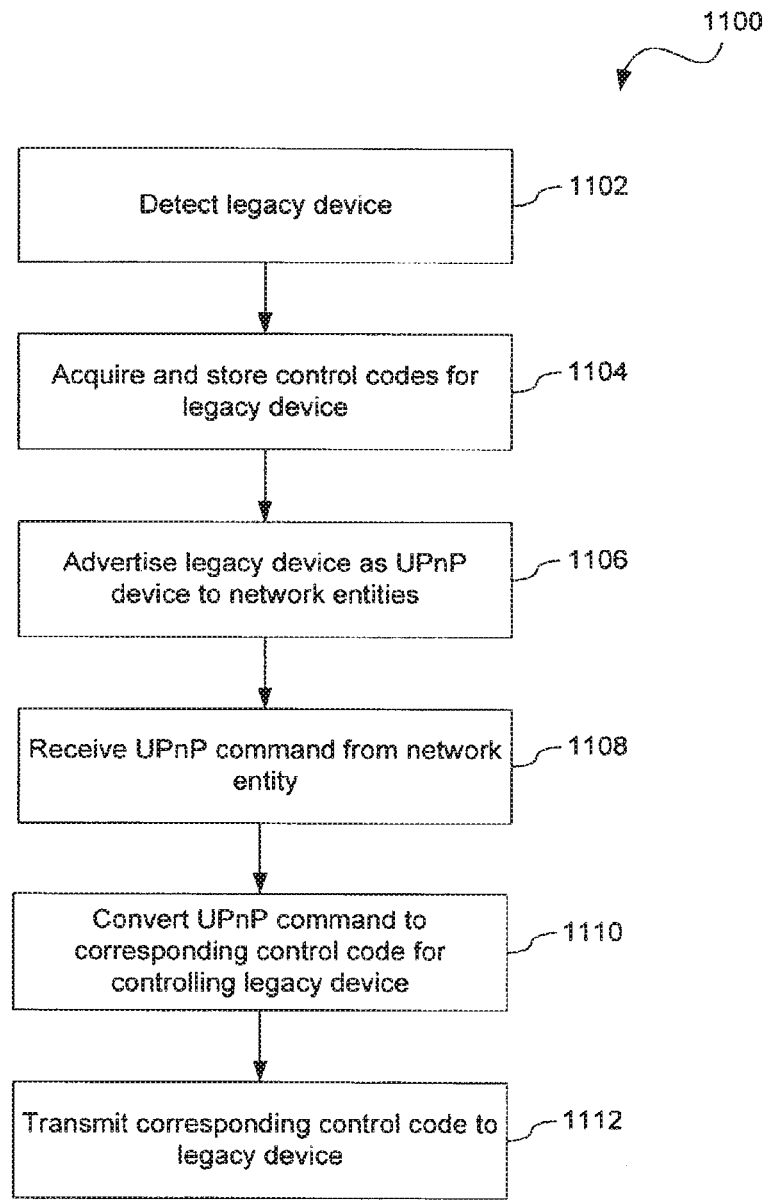
FIG. 11 depicts a flowchart of a method for legacy device virtualization, advertisement and control in accordance with an embodiment of the present invention.

FIG. 11 depicts a flowchart 1100 of a method for legacy device virtualization, advertisement and control in accordance with an embodiment of the present invention. The invention, however, is not limited to the description provided by the flowchart 1100. Rather, it will be apparent to persons skilled in the relevant art(s) from the teachings provided herein that other functional flows are within the scope and spirit of the present invention. The flowchart 1100 will be described with continued reference to the exemplary virtualization appliance 1002 of FIG. 10, although the invention is not limited to that embodiment.

The method of flowchart 1100 begins at step 1102, in which the virtualization appliance 1002 detects a legacy device, such as a consumer electronic device, that it will control. By detecting legacy devices, virtualization appliance 1002 builds a list of legacy devices under its control. In an embodiment, virtualization appliance 1002 is made aware of a legacy devices through manual programming of virtualization appliance 1002 by a user. In an alternate embodiment, virtualization appliance 1002 detects a legacy device through an automatic process, such as two-way IR queries between virtualization appliance 1002 and a legacy device.

At step 1104, virtualization appliance 1002 acquires and stores control codes for the legacy device. In an embodiment, these control codes are obtained through manual programming of virtualization appliance 1002 by a user. In an alternate embodiment, virtualization appliance 1002 obtains the control codes through an automatic process, such as two-way IR queries between virtualization appliance 1002 and a legacy device.

At step 1106, virtualization appliance 1002 advertises the legacy device to the network as a UPnP device possessing attributes and controls similar to the legacy device it is masquerading for. In an embodiment, this step includes publishing a list of standard UPnP commands for controlling the legacy device, wherein the published UpnP commands correspond to one or more of the low-level legacy device codes acquired in step 1104. As a result of this step, entities on the network perceive virtualization appliance 1002 as a piece of IP-addressable and controllable consumer electronics.

At step 1108, a network entity transmits a standard UPnP command, such as "Power On" or "Power Off", to control the legacy device, and this UPnP command is received by virtualization appliance 1002. At step 1110, virtualization appliance 1002 converts the UPnP command to a corresponding control code for the legacy device, and at step 1112, virtualization appliance 1002 transmits the corresponding control code to the legacy device. By converting UpnP commands to legacy device control codes in this manner, virtualization appliance 1002 acts as a transparent proxy between network entities and the legacy device.

In an alternate embodiment of the present invention, legacy device virtualization is performed by a network entity other than the legacy device bridge, such as by control server 102 described above in reference to FIG. 1. In accordance with this embodiment, control server 102 performs the functions of acquiring and storing control codes for a legacy device, advertising the legacy device to the network as a UPnP device, and converting UPnP commands received from network entities to corresponding control codes for the legacy device. The control server then sends these control codes to a legacy device bridge that converts them from an IP format to the appropriate legacy device format, such as an IR or serial format. Thus, in accordance with this embodiment, control server 102 performs the virtualization functions and uses the legacy device bridge as a simple IP-to-IR/serial converter-transmitter. The decision as to whether the control server 102 or the legacy device bridge is used to perform the virtualization function turns primarily on cost. One of the advantages of using a centralized server as the virtualization machine is that the legacy device bridges can be made more cheaply, since they will require less resources for processing and storage.

E. Method for Reporting State in Legacy Devices in Accordance with Embodiments of the Present Invention An embodiment of the present invention facilitates the reporting of device state in legacy consumer electronic devices. Conventional device discovery and control protocols, such as UPnP, typically allow compliant devices to publish methods by which interested network entities may query them for state information. For example, a UPnP home controller might wish to query a UPnP TV to see if it is currently on. The majority of conventional consumer electronics, however, do not provide such status reporting mechanisms.

Accordingly, a legacy device bridge in accordance with an embodiment of the present invention uses probes to extract information from its environment to extrapolate device state.

Figure 12:
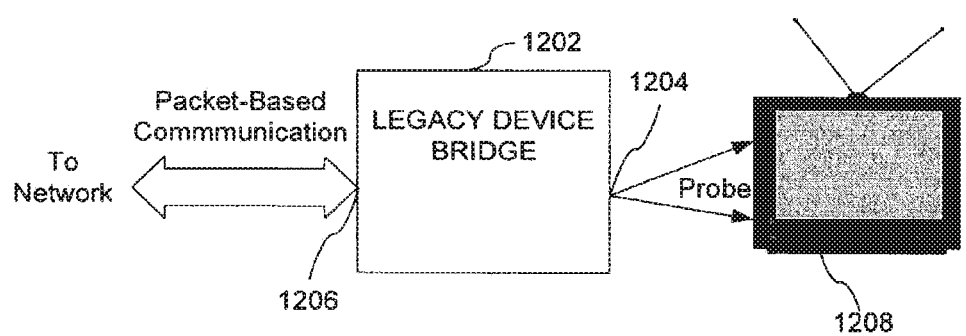
FIG. 12 illustrates a legacy device bridge adapted for extracting and reporting legacy device state in accordance with an embodiment of the present invention.

For example, FIG. 12 depicts a legacy device bridge 1202 adapted for extracting and reporting legacy device state in accordance with an embodiment of the present invention. As shown in FIG. 12, legacy device bridge 1202 comprises a light-sensitive probe 1204 that is aimed at the screen of a legacy television 1208. Light sensitive probe 1204 comprises a simple on/off meter that is used to determine whether legacy television 1206 is on or off. This state information may then be reported by legacy device bridge 1202 to other devices on a packet network via a network interface 1206. In an embodiment, legacy device bridge 1202 comprises a virtualization appliance that publishes state information to other devices on a packet network in accordance with a packet-based discovery and control protocol, such as UPnP.

As will be appreciated by persons skilled in the relevant art(s), state probes other than a light sensitive probe may be used to extract information relating to the state of a legacy device in accordance with embodiments of the present invention. The types of state probe will vary with respect to the device state that the legacy device bridge is attempting to discern.

F. Processor-Based Implementations

Figure 13:
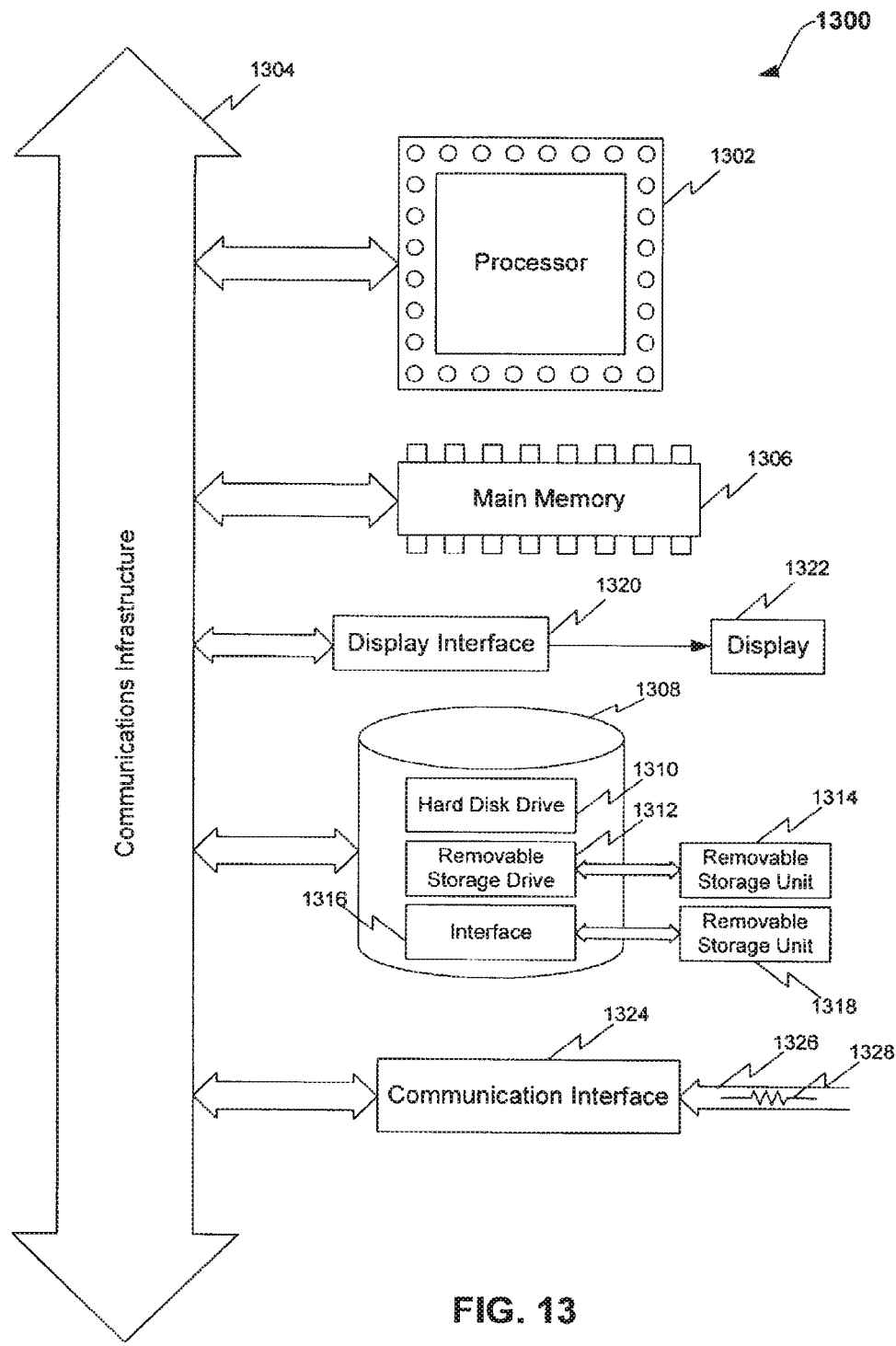
FIG. 13 depicts a processor-based computer system for implementing various features of the present invention.

The functions of a legacy device bridge, virtualization appliance, control server or other network entity described herein, may be implemented in software and executed by one or more processor-based computer systems. FIG. 13 depicts an example computer system 1300 that may execute software for implementing the features of the present invention, including, but not limited to, any or all of the method steps of flowcharts 400, 700, 900, or 1100 described above in reference to FIGS. 4, 7, 9 and 11, respectively.

As shown in FIG. 13, example computer system 1300 includes a processor 1302 for executing software routines in accordance with embodiments of the present invention. Although a single processor is shown for the sake of clarity, computer system 1300 may also comprise a multi-processor system. Processor 1302 is connected to a communications infrastructure 1304 for communication with other components of computer system 1300. Communications infrastructure 1304 may comprise, for example, a communications bus, cross-bar, or network.

Computer system 1300 further includes a main memory 1306, such as a random access memory (RAM), and a secondary memory 1308. Secondary memory 1308 may include, for example, a hard disk drive 1310 and/or a removable storage drive 1312, which may comprise a floppy disk drive, a magnetic tape drive, an optical disk drive, flash memory, or the like. Removable storage drive 1312 reads from and/or writes to a removable storage unit 1314 in a well known manner. Removable storage unit 1314 may comprise a floppy disk, magnetic tape, optical disk, or the like, which is read by and written to by removable storage drive 1312. As will be appreciated by persons skilled in the relevant art(s), removable storage unit 1314 includes a computer usable storage medium having stored therein computer software and/or data.

In alternative embodiments, secondary memory 1308 may include other similar means for allowing computer programs or other instructions to be loaded into computer system 1300. Such means can include, for example, a removable storage unit 1318 and an interface 1316. Examples of a removable storage unit 1318 and interface 1316 include a program cartridge and cartridge interface (such as that found in video game console devices), a removable memory chip (such as an EPROM, or PROM) and associated socket, and other removable storage units 1318 and interfaces 1316 that allow software and data to be transferred from removable storage unit 1318 to computer system 1300.

Computer system 1300 further includes a display interface 1320 that forwards graphics, text, and other data from communications infrastructure 1304 or from a frame buffer (not shown) for display to a user on a display unit 1322.

Computer system 1300 also includes a communication interface 1324. Communication interface 1324 allows software and data to be transferred between computer system 1300 and external devices via a communication path 1326. Examples of communication interface 1324 include a modem, a network interface (such as Ethernet card or 802.11b interface), a communication port, and the like. Communication interface 1324 may also include I/O communication interfaces common to consumer electronic devices, such as one or more IR ports and/or serial ports. Software and data transferred via communication interface 1324 are in the form of signals 1328 which can be electronic, electromagnetic, optical or other signals capable of being received by communication interface 1324. These signals 1328 are provided to communication interface 1324 via communication path 1326.

As used herein, the term "computer program product" may refer, in part, to removable storage unit 1314, removable storage unit 1318, a hard disk installed in hard disk drive 1310, or a carrier wave carrying software over communication path 1326 (wireless link or cable) to communication interface 1324. A computer useable medium can include magnetic media, optical media, or other recordable media, or media that transmits a carrier wave or other signal. These computer program products are means for providing software to computer system 1300.

Computer programs (also called computer control logic) are stored in main memory 1306 and/or secondary memory 1308. Computer programs can also be received via communication interface 1324. Such computer programs, when executed, enable computer system 1300 to perform the features of the present invention as discussed herein. In particular, the computer programs, when executed, enable processor 1302 to perform the features of the present invention. Accordingly, such computer programs represent controllers of the computer system 1300.

The features of the present invention can be implemented as control logic in software, firmware, hardware or any combination thereof. In an embodiment where features of the present invention are implemented using software, the software may be stored in a computer program product and loaded into computer system 1300 using removable storage drive 1312, hard disk drive 1310 or communication interface 1324. Alternatively, the computer program product may be downloaded to computer system 1300 over communication path 1326. The software, when executed by processor 1302, causes processor 1302 to perform features of the invention as described herein.

In another embodiment, features of the present invention are implemented in firmware and/or hardware using, for example, hardware components such as application specific integrated circuits (ASICs). Implementation of a hardware state machine so as to perform the functions described herein will be apparent to persons skilled in the relevant art(s) from the teachings herein.

G. Alternate Embodiments of the Present Invention

It should be noted that the legacy device bridge and virtualization appliance described herein are not limited to use of the 802.11b standard as a wireless communications medium. Although 802.11b may be used due to its low cost-of-goods and relative speed, any IP-capable wireless protocol, including but not limited to 802.11a or 802.11g, can be used as a substitute. Moreover, the legacy device bridge and virtualization appliance is not limited to use of a wireless protocol for IP-based networking. Although wireless devices may be used due to their convenience and lack of cabling, wireline communications, including but not limited to Ethernet, home phone line, or home power line networking, can be used as a substitute.

It should also be noted that the legacy device bridge and virtualization appliance described herein is not limited to the use of UPnP as a discovery and control protocol. Although UPnP may be used because of its growing acceptance as an industry standard in device discovery and control, any conventional packet-based discovery and control protocol, including but not limited to Jini™, a protocol developed by Sun Microsystems of Santa Clara, Calif., or the Rendezvous™ protocol, an open protocol developed, in part, by Apple Computer, Inc. of Cupertino, Calif., can be used as a substitute.

Furthermore, the virtualization appliance described herein is not limited to acting as a proxy for a single piece of legacy equipment. Rather, the virtualization appliance can advertise itself as any number of devices. Furthermore, in an embodiment, the virtualization appliance can also query a legacy device to obtain IR/serial command sets, thus obviating the need to store IR/serial command sets on the appliance or a separate network server.

H. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method performed by a bridge device for determining state information related to a legacy device and providing the state information via a network that communicates information in accordance with a packet-based communication protocol, wherein the legacy device is not adapted for communication in accordance with the packet-based communication protocol, comprising:

extracting information from an indoor environment in which the bridge device is located via which a state of the legacy device can be determined, the indoor environment being external to the legacy device and the legacy device being incapable of reporting the state to the bridge device;

determining the state of the legacy device based on the extracted information; and providing information related to the state of the legacy device from the bridge device to one or more devices on the network using the packet-based communication protocol.

2. The method of claim 1, wherein the bridge device extracts the information from the indoor environment in which the bridge device is located using a probe.

3. The method of claim 1, wherein the one or more devices on the network comprise one or more of a mobile controller, a personal digital assistant (PDA), a tablet computer, or a personal computer (PC) based computer system.

4. The method of claim 3, wherein the packet based communication protocol comprises a TCP/IP protocol.

5. The method of claim 4, wherein the network comprises a wireless local area network.

6. The method of claim 2, wherein the probe is a light sensitive probe.

7. The method of claim 1, wherein the legacy device comprises one of a television, a video cassette recorder (VCR), a digital video disk (DVD) player, a stereo receiver, an electronic thermostat, a lamp, or a video camera.

8. A bridge device for determining state information related to a legacy device and providing the state information via a network that communicates information in accordance with a packet-based communication protocol, wherein the legacy device does not communicate in accordance with the packet-based communication protocol, the bridge device comprising:
  a component configured to extract information from an indoor environment in which the bridge device is located via which a state of the legacy device can be determined, the indoor environment being external to the legacy device and the legacy device being incapable of reporting the state to the bridge device; and
  wherein the bridge device is configured to:
  determine the state of the legacy device based on the information extracted from the indoor environment in which the bridge device is located; and
  provide information related to the state of the legacy device to a device on the network using the packet-based communication protocol.

9. The bridge device of claim 8, wherein the component comprises a probe.

10. The bridge device of claim 9, wherein the probe comprises a light-sensitive probe.

11. The bridge device of claim 8, wherein the bridge device further comprises an interface by which to provide the information related to the state of the legacy device to the device on the network.

12. The bridge device of claim 11, wherein the interface comprises a wireless local area network interface.

13. The bridge device of claim 8, wherein packet-based communication protocol comprises a TCP/IP protocol.

14. The bridge device of claim 8, wherein the legacy device is one of a television, a video cassette recorder (VCR), a digital video disk (DVD) player, a stereo receiver, an electronic thermostat, a lamp, or a video camera.

15. A computer program product comprising a computer-readable memory device having instructions stored thereon that, when executed by a processing device, perform a method for determining state information related to a legacy device and providing the state information via a network that communicates information in accordance with a packet-based communication protocol, wherein the legacy device is not adapted for communication in accordance with the packet-based communication protocol, the method comprising:
  receiving information extracted from an indoor environment in which the bridge device is located via which a state of the legacy device can be determined, the indoor environment being external to the legacy device and the legacy device being incapable of reporting the state to the bridge device;
  determining the state of the legacy device based on the extracted information; and
  providing information related to the state of the legacy device from the bridge device to one or more devices on the network using the packet-based communication protocol.

16. The computer program product of claim 15, wherein the packet-based communication protocol comprises a TCP/IP protocol.

17. The computer program product of claim 15, wherein the one or more devices on the network comprise one or more of a mobile controller, a personal digital assistant (PDA), a tablet computer, or a personal computer (PC) based computer system.

18. The computer program product of claim 17, wherein receiving the information extracted from the indoor environment in which the bridge device is located via which the state of the legacy device can be determined comprises receiving the information from a probe.

19. The computer program product of claim 15, wherein the network comprises a wireless local area network.

20. The computer program product of claim 18, wherein the probe comprises a light sensitive probe.

* * * * *